US006443675B1

(12) United States Patent
Kopras et al.

(10) Patent No.: US 6,443,675 B1
(45) Date of Patent: Sep. 3, 2002

(54) HAND-HELD POWER TOOL

(75) Inventors: Robert K. Kopras, Black Earth; Jason R. Kopras, Mount Horeb; Scott Adler, Madison; Douglas Seals, Fitchburg; Ryan Rindy, Madison; Larry Gunseor, New Glarus; Daniel Bullis, Madison, all of WI (US)

(73) Assignee: Roto Zip Tool Corporation, Cross Plains, WI (US)

(*) Notice: Subject to any disclaimer, the term of this patent is extended or adjusted under 35 U.S.C. 154(b) by 0 days.

(21) Appl. No.: 09/506,244

(22) Filed: Feb. 17, 2000

(51) Int. Cl.[7] .......................... B23C 1/20; B23Q 11/12; B25G 1/08; B25G 3/00

(52) U.S. Cl. ...................... 409/182; 409/137; 409/135; 408/16; 408/124; 144/136.95; 144/154.5; 16/DIG. 24; 16/422; 16/111.1; 16/DIG. 12; 310/47; 310/50; 403/322.4

(58) Field of Search ................................ 409/175, 181, 409/182, 137, 134, 135; 144/136.95, 154.5, 371; 16/DIG. 24, 436, 422, 111.1, DIG. 12; 310/47, 50; 408/124, 241 R, 16; 307/326–328; 403/33, 322.4, 360; 451/358

(56) References Cited

U.S. PATENT DOCUMENTS

| | | | | |
|---|---|---|---|---|
| 1,423,511 A | * 7/1922 | Baker | ...................... | 144/252.1 |
| 2,263,136 A | * 11/1941 | Knouse et al. | ........... | 200/293.1 |
| 2,842,173 A | * 7/1958 | Turner et al. | .......... | 144/136.95 |

(List continued on next page.)

FOREIGN PATENT DOCUMENTS

| | | |
|---|---|---|
| DE | 4326652 A | 1/1994 |
| DE | 19503526 | 8/1996 |
| DE | 19532298 | 6/1997 |
| DE | 19628946 | 1/1998 |
| DE | 19646863 | 5/1998 |
| EP | 878273 | 11/1998 |
| JP | 56-56313 | 5/1981 |

OTHER PUBLICATIONS

PCT Form/ISA/220, International Search Report for Application, PCT/US 00/16066; Jun. 12, 2000.

*Primary Examiner*—A. L. Wellington
*Assistant Examiner*—Erica E Cadugan
(74) *Attorney, Agent, or Firm*—Foley & Lardner

(57) ABSTRACT

A hand-held power tool, such as a spiral cutting tool, with improved operator control and visibility. The power tool includes a motor contained in a motor housing. The motor may be a variable speed motor controlled by a speed control user interface mounted on the housing. Each time a speed control button is actuated, the motor speed is changed. A display provides the operator of the tool with an indication of the motor speed selected. A detachable handle is provided with a moveable mechanism for easily, quickly, and securely attaching the handle to the housing and removing the handle therefrom with one hand. The detachable handle may include one or more storage compartments formed therein. The detachable handle includes a trigger switch mounted therein for operating the cutting tool motor. The trigger switch is mounted in the detachable handle in a position such that the switch is operated by the little finger and ring finger of an operator's hand. The trigger switch is coupled to a motor controller within the motor housing without use of a direct mechanical connection, so as not to interfere with the easy and quick attachment and detachment of the handle to and from the housing. Operation of the trigger switch is enabled by a multiple-position power switch mounted on the housing. High-output LEDs are mounted in the housing to direct beams of light toward a workpiece at the point of a cut, to improve workpiece visibility. Air vents are provided for directing a flow of air onto a workpiece being cut to remove cutting debris therefrom to further improve operator visibility.

49 Claims, 9 Drawing Sheets

U.S. PATENT DOCUMENTS 3,767,876 A * 10/1973 Batson ........................ 200/331
3,919,573 A * 11/1975 Schmuck ...................... 310/50
4,050,003 A * 9/1977 Owings et al. ............... 310/50
4,381,037 A * 4/1983 Cuneo ........................ 408/710
4,513,381 A * 4/1985 Houser, Jr. et al. ......... 700/168
4,653,356 A 3/1987 Golden
4,689,534 A * 8/1987 Gerber et al. ................. 310/47
4,796,682 A * 1/1989 Michaels ............... 144/136.95
4,808,862 A * 2/1989 Carvalho et al. ............. 310/50
4,856,195 A * 8/1989 Grossman et al. ............ 16/436
4,932,294 A 6/1990 Chang
4,938,642 A 7/1990 Imahashi et al.
5,029,706 A * 7/1991 McCracken ................. 409/182
5,074,081 A 12/1991 Beth et al.
5,257,654 A 11/1993 Bean et al.
5,265,657 A 11/1993 Matsumoto et al.
5,445,479 A 8/1995 Hillinger
5,553,675 A * 9/1996 Pitzen et al. .................. 310/50
5,558,570 A * 9/1996 Nakamura et al. ..... 16/DIG. 24
5,813,805 A 9/1998 Kopras
5,902,080 A 5/1999 Kopras

* cited by examiner

HAND-HELD POWER TOOL

FIELD OF THE INVENTION

This invention pertains generally to hand-held power tools such as spiral cutting tools.

BACKGROUND OF THE INVENTION

A spiral cutting tool is a hand-held power tool having an electric motor that rotates a spiral cutting tool bit at high speeds. A spiral cutting tool bit includes a sharp cutting edge that is wrapped in a spiral around the axis of the bit. The spiral cutting tool bit is designed for cutting perpendicular to the axis of the bit. The electric motor that drives the bit is enclosed in a motor housing. The motor housing is generally cylindrical in shape, with the spiral cutting tool bit extending from one end of the motor housing along the axis of the housing. A spiral cutting tool is used to remove material from a workpiece by moving the rotating spiral cutting tool bit through the workpiece in a direction perpendicular to the axis of rotation of the bit. A spiral cutting tool is conventionally operated by grasping the motor housing with one or both hands, turning on the electric motor to begin high-speed rotation of the spiral cutting tool bit, plunging the spinning spiral cutting tool bit into a workpiece, such as a piece of wood, and then moving the cutting tool bit through the workpiece in a direction perpendicular to the axis of the spiral cutting tool bit by moving the motor housing in a direction parallel to the plain of the workpiece surface while keeping the axis of the motor housing generally perpendicular to the workpiece surface.

Precise control of a cut being made by a spiral cutting tool, or any other hand-held power tool, is dependent upon at least two factors: the tool operator maintaining a firm grasp on the tool, and good visibility of the workpiece at the point of the cut.

Various methods have been employed to ensure that an operator may maintain a firm grip on a hand-held power tool. With extended and continuous operation, the motor housing of a spiral cutting tool can become warm, and cutting tool vibrations may cause an operator's hands and arms to become fatigued. Extended and continuous use of a spiral cutting tool by grasping the motor housing can, therefore, become uncomfortable, reducing the ability of the operator to precisely control the cut being made. U.S. Pat. No. , 5,813,805 issued to Robert K. Kopras, describes a detachable handle for spiral cutting tools and other similar hand-held power tools. The detachable handle provides for extensive continuous use of the power tool while maintaining operator comfort and cutting tool control. The handle may be attached securely to the spiral cutting tool when the tool is to be used for extended periods of time, or generally to enhance the operator's comfort and control in using the spiral cutting tool. The handle may be removed from the tool, for example, when the spiral cutting tool is to be used in tight quarters wherein the handle might become an obstacle to precise control of the spiral cutting tool. The handle is removably secured to the spiral cutting tool by threaded knobs that are inserted through mounting holes in the ends of the handle and tightly threaded into threaded holes formed in handle lugs extending from the motor housing. The threaded knobs are preferably designed so that the detachable handle may be secured tightly to the handle lugs by hand, without the need for a wrench or other tool. Although the threaded knobs may be tightened and removed by hand, they can take some time to thread and unthread from the handle, thereby increasing the time required for attaching the handle to and removing the handle from the motor housing. The detachable handle also features compartments formed therein for holding various spiral cutting tool accessories, such as extra spiral cutting tool bits and a wrench for securing the bits to the spiral cutting tool.

Many hand-held power tools include a power on/off switch mounted on the tool motor housing, rather than on a tool handle. In such tools, the tool motor cannot be controlled by the hand, usually the dominant hand, which is grasping the tool by the handle. Some hand-held power tools, therefore, have power on/off trigger switches mounted in or near the tool handle. However, such handles are not removable. Furthermore, such trigger switches are typically mounted in the handle of the power tool such that the trigger switch is operated by the forefinger, or forefinger and index finger, of the operator's hand. These are typically the strongest fingers of the hand, which must be used, therefore, in such tools, to both hold and control the tool while simultaneously operating the trigger switch. This can increase fatigue and reduce the operator's effective control of the tool.

The second significant factor in making a precise cut using a spiral cutting tool, or any other hand-held power tool, is operator visibility at the point of the cut. Such visibility can be reduced by a build-up of cutting debris, e.g., sawdust, removed from the workpiece by the tool at the point of a the cut, and poor lighting at the point of the cut. Some power tools employ vacuum systems connected to the tool to remove cutting debris from the point of the cut. However, the use of such a vacuum system often makes use of the tool more cumbersome. Proper lighting at the point of a cut can be a problem, both in generally poorly lighted construction environments and, more generally, in any environment where the operator of the tool and the tool itself cast a shadow over the workpiece at the point of the cut.

What is desired, therefore, is an improved spiral cutting tool, or other hand-held power tool, which includes features for improving operator control of the tool and operation visibility at the point of a cut being made using the tool.

SUMMARY OF THE INVENTION

The present invention provides an improved hand-held power tool, such as a spiral cutting tool, including features for improving an operator's ability to operate the tool to provide a precise cut. The present invention provides a hand-held power tool with features for improving both operator control of the tool and operator visibility at the point of a cut being made using the tool.

The present invention provides an easily detachable handle for a spiral cutting tool and other similar hand-held power tools. The use of the detachable handle provides for extensive continuous use of the tool while maintaining operator comfort and tool control. The detachable handle of the present invention includes a gripping surface for an operator's hand which is oriented substantially parallel with the axis of the tool housing. Precise control of the tool is maintained by grasping the tool with two hands, one on the handle, the other on the tool motor housing. The detachable handle facilitates positioning the tool with its axis perpendicular to the workpiece, and moving the tool along the plane of the workpiece in a direction perpendicular to the axis of the tool.

A detachable handle in accordance with the present invention is easily and quickly attachable to the motor housing of a spiral cutting tool, or other hand-held power tool, and is easily and quickly detachable therefrom. The detachable handle may be attached securely to the tool when the tool is to be used for extended periods of time, or generally to enhance the operator's comfort and control in using the tool, and may be removed easily and quickly from the tool, for example, when the tool is to be used in tight quarters, where the detachable handle might become an obstacle to precise control of the tool.

A detachable handle in accordance with the present invention preferably has two handle ends, each of which is securely but detachably attachable to a hand-held power tool housing. This provides a very securely attachable and stable handle for the tool. The structures by which the handle is detachably attached to the tool housing preferably provide for easy and quick removal of the handle from the housing when desired. In accordance with the present invention, a detachable handle may include a fixed handle mounting structure, such as fixed tab projections, extending from one end of the handle, and a moveable handle mounting mechanism, such as a rotatable rod, extending from the other end of the handle. Fixed housing mounting structures, such as housing apertures, are formed in the tool housing and positioned therein for receiving the extending tabs and rotatable rod which extend from the ends of the handle. The extending tabs preferably are hook-shaped, such that the tabs may be hooked into the corresponding apertures formed in the tool housing. The rotatable rod preferably includes a distal radially extending portion formed at the distal end thereof, which is sized to fit through a slot formed in the corresponding aperture formed in the tool housing. The rotatable rod may be mounted in the corresponding aperture formed in the housing by rotating the rod so as to align the distal radially extending portion with the slot formed in the corresponding aperture formed in the housing. The rotatable rod is then rotated such that the distal radially extending portion is aligned perpendicularly to the slot, thereby preventing removal of the rod, and, therefore, the handle, from the aperture formed in the housing. A second radially extending portion may be formed on the rotatable rod to engage a threaded wall formed in the corresponding aperture in the tool motor housing. The second radially extending portion and threaded wall interact to pull the end of the handle tightly against the tool housing as the rod is rotated, to thereby secure the handle to the tool housing. The rotatable rod may preferably be rotated by a lever mechanism attached to the rod and extending from the detachable handle. The rotatable rod and lever are preferably mounted on the top or thumb end of the detachable handle. A thumb tab is preferably formed extending from the lever to facilitate movement of the lever by an operator's thumb. The detachable handle may, therefore, be easily and quickly attached to the tool housing by an operator by inserting the extending tabs and rotatable rod into the apertures formed in the housing and operating the lever mounted on the detachable handle to rotate the rotatable rod to secure the handle to the housing. By operating the lever mounted on the detachable handle in the opposite direction, the detachable handle is easily and quickly removed from the housing.

A detachable handle in accordance with the present invention preferably includes one or more compartments formed therein, e.g., for holding and storing spiral cutting tool or other handle-held power tool accessories. The compartment may be accessible through an aperture formed in the detachable handle, which may be covered by a hinged door.

In accordance with the present invention, a detachable handle for a spiral cutting tool, or other hand-held power tool, preferably includes an on/off trigger switch, for activating the tool, mounted therein. The trigger switch is preferably mounted on an inside of the detachable handle, i.e., on the side of the handle facing the tool housing when the handle is attached to the tool. The trigger switch is preferably mounted at a lower end of the inside of the handle, such that the trigger switch is operable by the little finger (pinky) and ring finger of the operator's hand. This allows the stronger middle finger, index finger, and thumb of the operator's hand to be used solely for holding and controlling the tool to which the handle is attached.

The trigger switch mounted in the detachable handle is coupled to a motor in the tool motor housing such that the motor is activated when the trigger switch is actuated and the detachable handle is mounted on the power tool housing. The trigger switch is preferably coupled to the tool motor via a motor controller mounted in the housing without a mechanical connection between the trigger switch and the motor controller. Such a mechanical connection between the trigger switch, mounted in the detachable handle, and the motor controller, mounted in the motor housing, might interfere with the easy and quick attachment of the detachable handle to, and removal of the detachable handle from, the tool housing. The trigger switch mounted in the detachable handle may be coupled to a magnet, mounted on a moveable arm mounted in the detachable handle, which is moved toward the tool housing when the trigger switch is actuated by an operator and the detachable handle is mounted on the housing. A Hall effect sensor, or similar magnetic field sensor, is mounted within the tool housing to detect the movement or position of the magnet. The magnetic field sensor is thus employed to detect the movement of the magnet in response to the activation of the trigger switch. The sensor is coupled to the motor controller which activates the tool motor in response to the detection of the movement of the magnet. Thus, activation of the tool motor by a trigger switch mounted in a detachable handle is achieved without providing a mechanical connection between the trigger switch, mounted in the detachable handle, and the motor controller for controlling the tool motor, mounted in the tool housing, thereby providing a rugged trigger switch coupling mechanism which does not interfere with the easy and quick attachment and detachment of the detachable handle to and from the tool housing.

A spiral cutting tool, or other hand-held power tool, in accordance with the present invention preferably includes a multiple-position power on/off switch mounted on the tool housing. The multiple-position power switch is used in combination with the trigger switch mounted in the detachable handle for controlling the power on/off state of the tool motor. The multiple-position power on/off switch mounted on the tool housing preferably includes at least three operating positions. In a first operating position of the multiple-position power on/off switch, the tool motor is turned off and the trigger switch is disabled. Thus, when the multiple-position power on/off switch is in this first position, the tool motor will not be activated even if the trigger switch mounted on the detachable handle attached to the tool housing is actuated. In a second position of the multiple-position power switch, the trigger switch mounted in the detachable handle mounted to the tool motor housing is enabled. Thus, when the multiple-position power switch is in this second position, the tool motor is activated only when the trigger switch mounted in the detachable handle is actuated. In a third position of the multiple-position power switch, the tool motor is activated. As long as the multiple-position power switch is in this third position, the tool motor will be in operation, whether or not the trigger switch in the detachable handle is actuated (or the detachable handle is even attached to the tool housing). The multiple-position power on/off switch in accordance with the present invention thus allows an operator of a spiral cutting tool, or other hand-held power tool, fully to control the power on/off state of the tool motor, including controlling when the power on/off state of the tool may be controlled by the trigger switch mounted in the detachable handle.

A spiral cutting tool, or other hand-held power tool, in accordance with the present invention preferably includes a variable speed motor. The operating speed of the motor may be controlled by a speed control button and user interface which allows an operator of the tool to select the operating speed of the motor, and which presents to the operator a visual indication of the speed selected. A hand-held power tool motor may begin operation at an initial operating speed when the tool motor is first turned on, by use of either a multiple-position power switch mounted on the tool housing or a trigger switch mounted on a detachable handle attached to the tool housing. A speed control button is provided on the tool housing and coupled to a motor controller. Each time the speed control button is actuated, the motor controller changes the speed of the motor in response thereto. For example, each time the speed control button is actuated, the motor speed may increase or decrease one step from the then-current operating speed, until either the highest or lowest available operating speed is reached, at which point, upon the next actuation of the speed control button, the motor is controlled to decrease or increase motor speed by one step. For example, if four motor operating speeds are made available, the motor speed may be increased or decreased by three steps from the initial motor operating speed, by one step each time the motor speed control button is actuated. Upon the fourth actuation of the motor speed control button, if the motor speed is at its lowest setting, the motor will be controlled to increase the motor speed to the next higher speed. If the motor speed is at its highest setting, the motor will be controlled to decrease the motor speed to the next lower speed. (Alternatively, the motor may be controlled to return to its initial operating speed upon the next actuation of the speed control button after either the highest or lowest operating speed is reached.) the motor speed will return to the initial operating speed. Thus, a single button is employed to cycle the tool motor through the available operating speeds. Motor speed indicator LEDs may be mounted on the spiral cutting tool housing near the motor speed control button, and illuminated by the motor controller to indicate to the operator of the tool the current motor speed selected. The speed control button and LEDs are preferably covered by a single piece of flexible plastic, which protects the speed control interface from cutting debris, while allowing the speed control button to be operated therethrough and the speed indication LEDs to be visible therethrough.

A spiral cutting tool, or other hand-held power tool, in accordance with the present invention preferably also provides for improved visibility of a workpiece at the point of a cut being made by the tool. Improved visibility under poor lighting conditions is provided by one or more high-output LEDs mounted in the tool housing near a position where the tool's motor shaft emerges from the housing, so as to direct a beam or beams of light toward a workpiece at the point of a cut being made by the tool. The LEDs may be mounted in aperture pockets or receptacles formed in the tool motor housing near the point where the tool motor shaft emerges from the tool. Multiple LEDs may be mounted in the tool housing at angles so as to provide beams of light which cross each other at the area of a cut. For example, at least two such high-output LEDs may be provided, which may be mounted on opposite sides of a tool motor shaft, in the tool housing, and at angles such that the beams provided by the high-output LEDs cross each other at a point which intersects with the axis of the tool motor shaft at a position in front of the tool motor shaft at which, e.g., a spiral cutting tool bit is to be mounted and at a point where the spiral cutting tool bit is cut into a workpiece. The LEDs may be controlled to turn on whenever the power switch is activated.

To further improve visibility of a workpiece being cut by a spiral cutting tool, or other hand-held power tool, the present invention provides for the clearing of cutting debris, e.g., sawdust, from a workpiece at the point of a cut being made by the tool. In accordance with the present invention, a spiral cutting tool, or other hand-held power tool, preferably includes a fan located within the motor housing and preferably attached to the motor shaft. When the motor is turned on, the fan is rotated at a high speed to draw air through the motor housing and across the tool motor to thereby cool the motor. One or more air exhaust vents may be formed in the motor housing at the end of the motor housing adjacent to the point where the motor shaft emerges from the motor housing, i.e., at the end of the shaft where a spiral cutting tool bit or other attachment is attached to the motor shaft. Air drawn through the motor housing by the fan is directed through the air vents onto the workpiece surface at the point of the cut, thereby blowing cutting debris away from the point of the cut, to enhance visibility thereof.

In some cases, e.g., for cutting gypsum board drywall, it may be preferred that cutting debris not be blown away from the point of a cut. In accordance with the present invention, a moveable air vent cover is provided. The moveable air vent cover is preferably mounted in the tool motor housing, and may be operated to close the vents in the motor housing which open toward the workpiece. The moveable air vent cover may also be formed to open other vents formed in the motor housing directed radially outward from the sides of the motor housing when the air vents directed toward the workpiece are closed. Air drawn through the motor housing to cool the motor may thereby be redirected in a direction radial to the tool, using the moveable air vent cover, so as to not disturb cutting debris from a workpiece being cut. The air vent cover may be implemented as a flat ring having vertically extending portions formed along an outer edge thereof. The flat ring includes apertures formed therein which may be aligned with the air vents formed in the end of the tool housing to allow exhaust air to be directed toward a workpiece being cut. The vertically extending portions are formed on the ring such that, when the ring is positioned such that the apertures formed therein are aligned with the air vents to allow air flow to be directed toward the workpiece, the vertically extending portions at least partially block the flow of air through other air vents formed in a sidewall of the tool housing. When the air vent cover is moved such that the apertures formed therein are moved out of alignment with the air vents directed toward the workpiece, to block the flow of air toward the workpiece, the vertically extending portions are moved away from the air vents formed in the side of the tool housing, to allow an increased flow of air therethrough. The air vent cover is preferably mounted in the tool housing for rotational movement therein, and may include a tab, lever, handle, or other structure attached thereto which extends from the housing, e.g., through a slot in the sidewall of the motor housing. Using this tab, the air vent cover may be rotated in the motor housing by an operator between positions allowing air flow through the air vents to be directed toward a workpiece, and blocking air flow toward the workpiece. Thus, an operator may direct a flow of air toward a workpiece to blow cutting debris therefrom, to enhance visibility of the workpiece surface at the point of a cut, or block such air flow, when desired.

The present invention thus provides a spiral cutting tool, or other hand-held power tool, having features which enhance the utility of the tool by providing for enhanced control and operation of the tool during use, and visibility of a workpiece being cut by the tool.

Further objects, features, and advantages of the invention will be apparent from the following detailed description of the invention, taken in conjunction with the accompanying drawings.

DETAILED DESCRIPTION OF THE INVENTION

Figure 1:
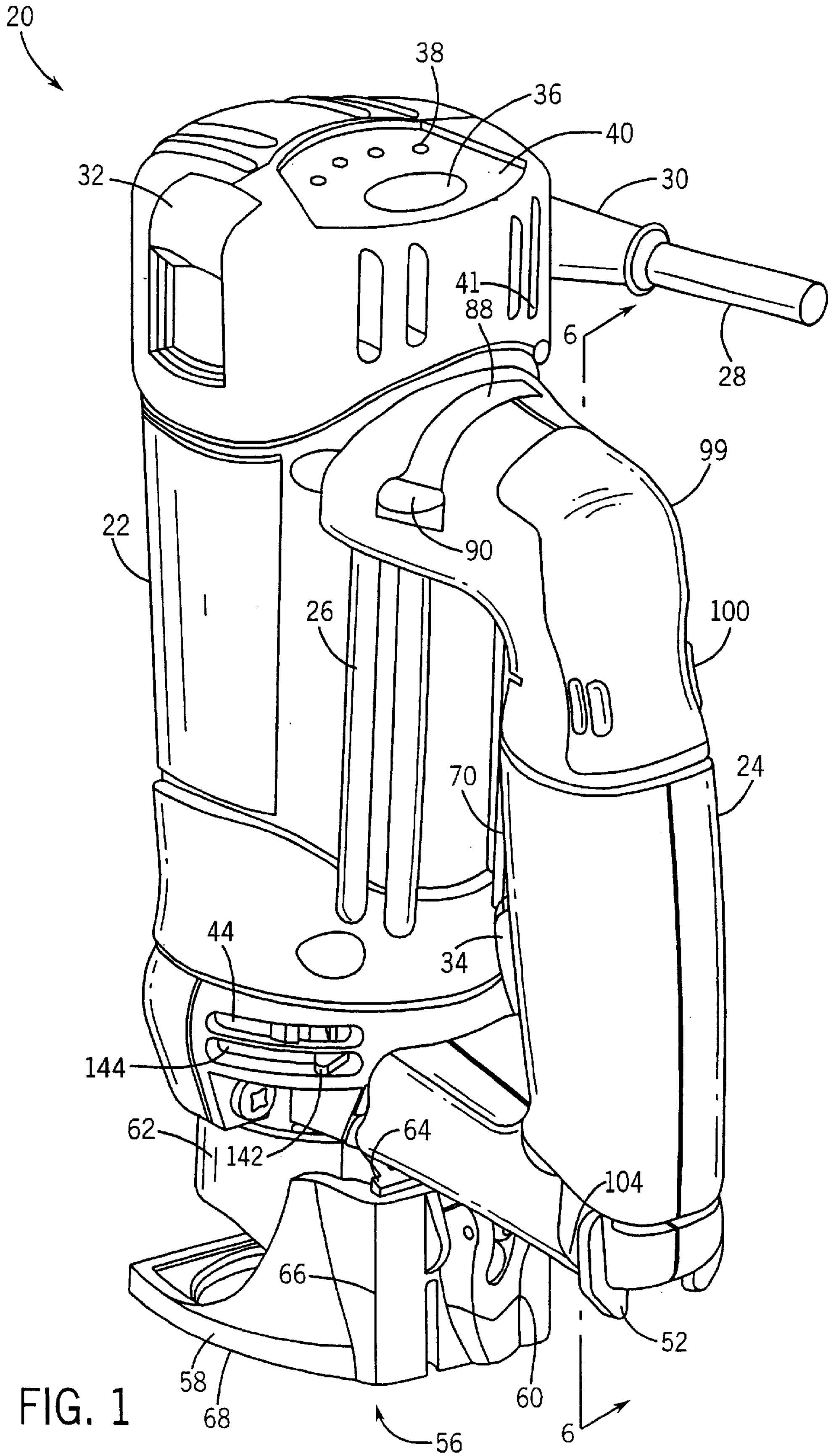
FIG. 1 is a perspective view of a spiral cutting tool in accordance with the present invention.
Figure 2:
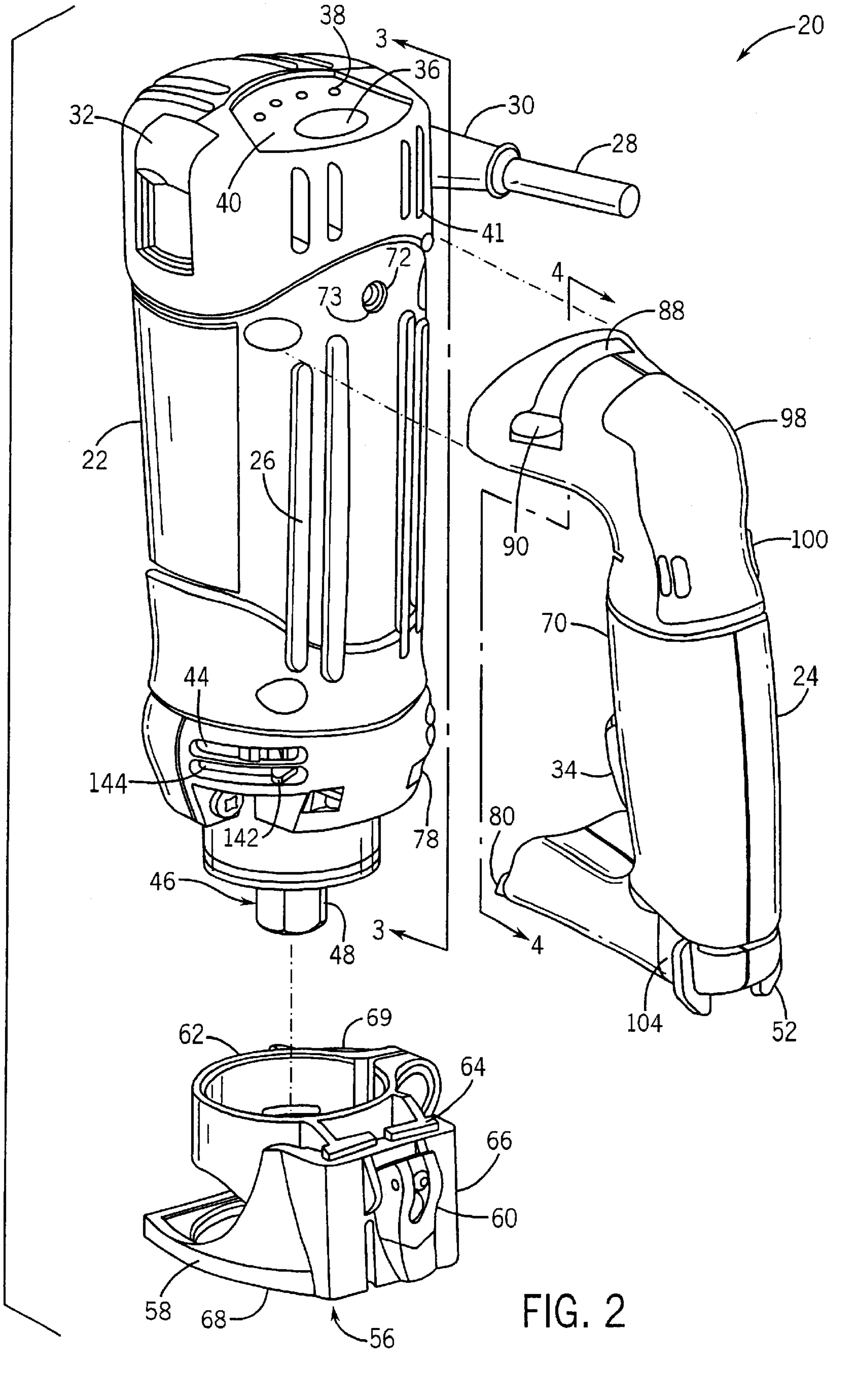
FIG. 2 is a perspective view of the spiral cutting tool of FIG. 1, showing a detachable handle and adjustable depth guide assembly removed therefrom.

A spiral cutting tool including features for improving the ability of an operator to operate and control the tool is shown generally at 20 in FIGS. 1 and 2. (It should be understood that, although the present invention will be described in detail herein with reference to the exemplary embodiment of spiral cutting tool 20, the present invention may be applied to, and find utility in, other hand-held power tools as well.) The spiral cutting tool 20 includes a motor housing 22 to which a detachable handle 24 is attached. The motor housing 22 is preferably made of an electrically insulating material, such as hard plastic. The motor housing 22 is generally cylindrical in shape, and may include raised gripping surfaces 26 formed thereon that allow a firm grip on the cutting tool 20 to be maintained when the cutting tool 20 is grasped around the motor housing 22. The motor housing 22 may be formed as two or more molded pieces which are joined together to form the housing 22 in a conventional manner, such as using fasteners, an adhesive, welding, or a combination thereof.

Figure 10:
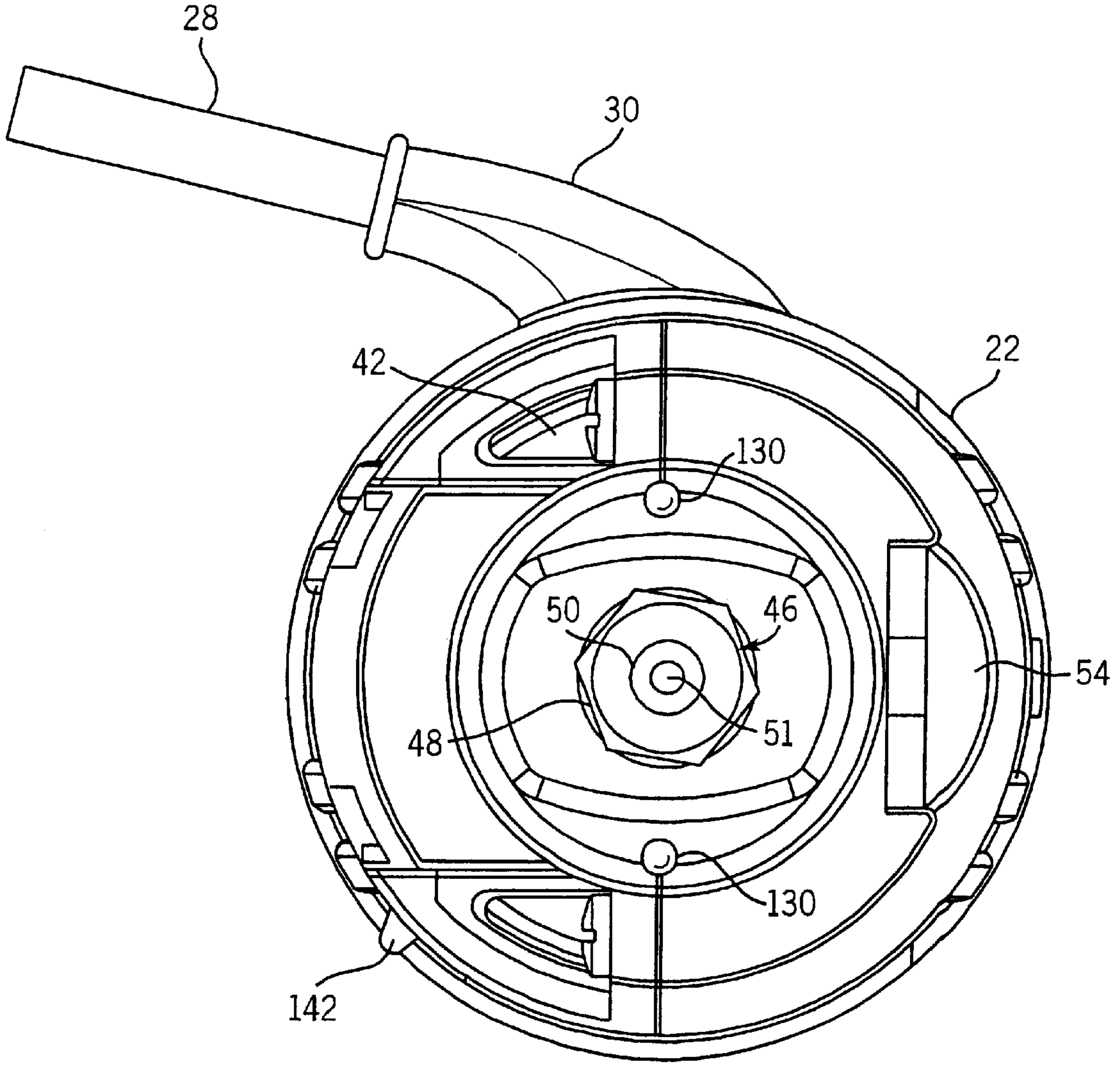
FIG. 10 is a bottom end view of a spiral cutting tool in accordance with the present invention, showing an end of the spiral cutting tool from which a spiral cutting tool motor shaft emerges, high output LEDs mounted therein for illuminating the surface of a workpiece being cut by the tool, and air vents formed therein for directing a flow of air at the workpiece to remove debris therefrom.

An electric motor (not visible in FIGS. 1 and 2) is enclosed within the motor housing 22. The motor receives electrical power through an electrical cord 28 (only a portion of which is shown in FIGS. 1 and 2). The electrical cord 28 may preferably include a rubber cover that stays flexible in cold operating environments. A thick rubber connecting sleeve 30 is preferably provided where the electrical cord 28 is joined to the motor housing 22. This connecting sleeve 30 provides strain relief at the end of the electrical cord 28 to prevent crimping, cracking, and excessive wear of the cord 28 where it is joined to the cutting tool 20. The connecting sleeve 30 is preferably made of a thicker or less pliable material than the rubber coating covering the electrical cord 28. As illustrated in FIGS. 1, 2, and 10, the connecting sleeve 30 preferably extends from a side of the motor housing 22 displaced radially from the position of the detachable handle 24 on the motor housing 22 by approximately 90°. The connecting sleeve 30 is bent or shaped to turn from the position where it is attached to the motor housing 22 in the direction of the position of the detachable handle 24 on the motor housing 22. Thus, the end of the electrical cord 28 which is connected by the connecting sleeve 30 to the tool 20 is positioned by the connecting sleeve 30 on the tool 20 such that the electrical cord 28 extends from the motor housing 22 in a direction toward an operator of the spiral cutting tool 20 holding the tool 20 by the detachable handle 24, but is displaced from the position of the handle 24. This positioning of the electrical cord 28 helps assure that the electrical cord 18 will not interfere with operation of the spiral cutting tool 22 as the tool 22 is used, e.g., to cut a workpiece.

The electric motor is turned on and off by a power on/off switch 32 mounted on the motor housing 22. As will be discussed in more detail below, the power on/off switch 32 is preferably a multiple-position on/off switch. As will also be described in more detail below, the electric motor may also be turned on and off by a trigger switch 34 mounted on the detachable handle 24. As will be discussed in more detail below, operation of the trigger switch 34 mounted in the detachable handle 24 to turn the electric motor on and off may be enabled by operation of the multiple position on/off power switch 32.

The electric motor is preferably capable of operation at multiple speeds. A motor speed control button 36 may be provided on the motor housing 22 for controlling the operating speed of the tool motor. The motor speed control button 36 may be implemented as a push button switch which changes the speed of the motor each time the switch 36 is depressed. Motor speed indicators, such as indicator LEDs 38, may be mounted on the motor housing 22 near the motor speed control switch 36 to indicate to an operator of the tool 20 the operating speed of the tool motor. The motor speed control switch 36 and motor speed indicators 38 may be covered, e.g., by a thin and flexible piece of plastic 40, attached to the motor housing 22 in a conventional manner, which prevents dust or other debris from entering the motor housing 22 and damaging or affecting operation of the switch 36, indicators 38, or other components within the motor housing 22.

For exemplary purposes only, a spiral cutting tool 20 in accordance with the present invention may have an electric motor capable of being operated at four speeds. When the motor is first turned on, e.g., using the multiple-position on/off switch 32, or the trigger switch 34, the motor begins operation at an initial preselected speed, e.g., a no-load rotation speed of 15,000 RPM. Each the time the motor speed control button 36 is actuated, with the motor on and running, the motor speed changes. For example, the motor speed may change from the initial 15,000 RPM to 20,000 RPM the first time the button 36 is actuated, from 20,000 RPM to 25,000 RPM the second time the button 36 is actuated, and from 25,000 RPM to 30,000 RPM the third time the button is actuated. When the motor speed control button 36 is actuated the fourth time, with the motor on and running, the motor speed preferably decreases by one step, e.g., back to 25,000 RPM. (Of course, more or fewer than four motor speeds may be provided, different motor speeds may be provided, and different increments between available motor speeds may be provided in accordance with the present invention. Also, the motor speed may be controlled to return to its initial operating speed upon the next actuation of the speed control button after either the highest or lowest operating speed is reached.) Appropriate ones of the motor speed indicator LEDs 38 are illuminated each time the motor speed control button 36 is actuated to indicate the operating speed of the motor. Of course, the speed of the motor may be controlled in a different manner in response to actuation of the motor speed control button 36. For example, the tool motor may start operation at a relatively high initial operating speed, with the speed of the motor reduced each time the motor speed control button 36 is actuated, or may start at a relatively low initial operating speed, with the speed of the motor increased each time the motor speed control button 36 is actuated. Preferably, a microprocessor or similar digital device is employed as a motor controller, mounted in the motor housing 22, to control the ramp up and ramp down of the speed of the cutting tool motor each time the motor speed control button 36 is actuated, and to control the motor speed indicator LEDs.

The motor controller may preferably be programmed to soft start the motor when the on/off switch 32 is actuated to turn the motor on initially. That is, the motor controller may control the motor to increase the motor speed gradually to the initial operating speed when the motor is first turned on via the on/off switch 32. (Note, however, that this soft start of the motor is preferably not employed when operation of the motor is started by actuation of the trigger switch 34, as will be described in more detail below.)

The electric motor of the cutting tool 20 drives a motor shaft. A fan, located within the motor housing 22, is preferably attached to the motor shaft. When the motor is turned on, by means of the multiple-position power on/off switch 32 or the trigger switch 34, the fan is rotated at a high speed to draw air through the motor housing 22 and across the electric motor, to thereby cool the motor. For this purpose, intake air vents 41 and exhaust air vents are preferably provided in the motor housing 22. Exhaust air vents are preferably formed in the end 42 (See FIG. 10) and on the side 44 of the housing 22, at the end of the housing 22 opposite the intake air vents 41. Cool air is drawn by the motor fan into the motor housing 22 through the air intake vents 41 to cool the electric motor, with warm air exhausted from the motor housing 22 through the exhaust air vents 42 and 44. As will be discussed in more detail below, the flow of air out of the exhaust air vents 42 and 44 may be directed and controlled to remove, or to prevent the removal of, cutting debris from the point of a cut being made using the cutting tool 20.

An end of the motor shaft extends from one end of the motor housing 22 along the axis thereof. Attached to the end of the motor shaft is a mechanical structure 46 for securing, e.g., a spiral cutting tool bit, or other accessory, to the motor shaft. A spiral cutting tool bit has a cutting edge spiraled around the axis of the bit. This cutting edge is designed such that the spiral cutting tool bit, when rotated at high speed, will cut through a workpiece in a direction perpendicular to the axis of the bit. In this cutting process, significant force is applied to the cutting tool bit perpendicular to the axis thereof. Thus, although a conventional drill-type chuck may be used for the structure 46 that mechanically connects the bit to the motor shaft, the preferred structure for securing the bit to the shaft is a collet-type system 46. As shown in FIG. 10, the collet bit attachment structure 46 includes a collet nut 48 and a collet 50 centered axially within a central aperture of the collet nut 48. The collet nut 48 is mounted on a threaded end of the motor shaft. To secure a bit to the motor shaft, a shank of the bit is inserted into a central aperture 51 of the collet 50. The collet nut 48 is then tightened, by hand and then with a wrench 52, until the bit is held securely. As the collet nut 48 is tightened down on the threaded end of the shaft, the collet 50 is compressed within the collet nut 48 between a partially closed end of the collet nut 48 and the shaft. The collet 50 is slotted and has tapered ends such that when the collet 50 is depressed between the collet nut 48 and the shaft, the collet is depressed radially, causing the central aperture 51 of the collet 50 to close tightly around the shank of the spiral cutting tool bit. To remove the bit from the motor shaft, the collet nut 48 is loosened, using the wrench 52, until the bit can be removed easily from the central aperture 51 of the collet 50.

A shaft lock 54 (FIG. 10) is used to prevent rotation of the motor shaft when the collet nut 48 is being loosened and tightened. The shaft lock 54 includes a shaft lock pin which extends through the motor housing 22. When the shaft lock 54 is depressed, the shaft lock pin engages the motor shaft, preventing rotation of the shaft, and allowing the collet nut 48 to be loosened and tightened. When the shaft lock 54 is released, a spring (not shown) attached to the shaft lock 54 causes the shaft lock pin to become disengaged from the motor shaft, allowing free rotation thereof.

To set the depth of cut to be made by the spiral cutting tool 20, an adjustable depth guide assembly 56 may be provided. The depth guide assembly 56 includes a depth guide 58, a locking mechanism 60, and a depth guide bracket 62. The depth guide bracket 62 is attached to the cutting tool housing 22 around the location where the motor shaft emerges from the housing 22. Preferably, the depth guide bracket 62 may be made detachable from the housing 22. The depth guide bracket 62 may be attached to the housing 22 in a conventional manner. For example, the depth guide bracket 62 may be formed to have a split collar structure and a cam closing mechanism 69 which is operated to close the collar tight around the end of the tool housing 22 to attach the bracket 62 thereto, and which may be operated to loosen the collar to remove the bracket 62 from the housing 22. The depth guide bracket 62 includes an extension 64 extending in an axial direction therefrom. The depth guide 58 includes a corresponding extension 66 extending in an axially direction therefrom and which is aligned and coupled with the extension portion 64 of the depth guide bracket 62. The two extending portions 64 and 66 may be formed such that one of the extending portions 64 includes a tongue which may be extended into a groove formed in the other extending portion 66 to join the depth guide 58 and depth guide bracket 62 together while keeping the axially extending portion 66 of the depth guide 58 aligned on the same axis with the axially extending portion 64 of the depth guide bracket 62. The depth of cut may be set by moving the depth guide 58 in an axial direction, by sliding the axially extending portion 66 thereof along the axially extending portion 64 of the depth guide bracket 62. The locking mechanism 60 is then engaged to lock the extending portions 64 and 66 together to securely fix the depth guide 58 in place. The locking mechanism 60 may be implemented as a cam lever 60, as shown, mounted on the extending portion 66 of the depth guide 58 and coupled to the extending portion 64 of the depth guide bracket 62 to lock the two extending portions 64 and 66 together tightly when the cam lever 60 is engaged. Alternatively, the locking mechanism may be implemented using a threaded nut or a screw for locking the extending portions 64 and 66 together tightly. When locked into position, the depth guide 58 provides a depth guide surface 68 which lies in a plane perpendicular to the axis of the spiral cutting tool 20. The main components which form the depth guide 56 may be molded of hard plastic, or made of any other suitable material.

The detachable handle 24 of the present invention is preferably detachably attachable to the motor housing 22 of the cutting tool 20. The handle 24 includes a gripping surface 70, which may be contoured in shape so that the handle 24 may be grasped comfortably in the hand by an operator of the cutting tool 20. The handle gripping surface 70 is aligned substantially parallel with the axis of the cutting tool housing 22. (It should be understood that the term "substantially parallel", as used in this context throughout this specification, means "more parallel than not". Therefore, the angle of the handle gripping surface 70 with respect to the axis of the cutting tool 20 may be varied from exactly parallel by several degrees. However, as the handle gripping surface 70 becomes more and more perpendicular to the axis of the motor housing 22, the effectiveness of the handle 24 for accurately controlling the type of cuts made by the spiral cutting tool 20 is reduced.) The handle gripping surface 70 may be made of a semi-rigid plastic material, for improving an operator's grip on the handle 24.

The handle 24 of the present invention allows the cutting tool 20 to be grasped more firmly and comfortably with both hands, to provide greater control of the tool 20 during operation, and thereby provides for more accurate cuts with less operator fatigue. The handle 24 also allows the cutting tool 20 to be grasped more firmly during motor start-up, during which the reaction torque of the tool motor can cause the tool 20 to twist. Thus, the handle 24 also facilitates safe use of the tool 20. It may be desirable, however, that the handle 24 be detached for some applications. For example, for making cuts in close quarters or obstructed areas, the handle 24 may become an obstruction, and actually interfere with the making of accurate cuts. Thus, it is desirable to provide both for securely attaching the handle 24 to the cutting tool 20 when needed, and allowing the handle 24 to be detached from the tool 20 when its use would interfere with accurate or safe operation of the tool 20.

Figure 3:
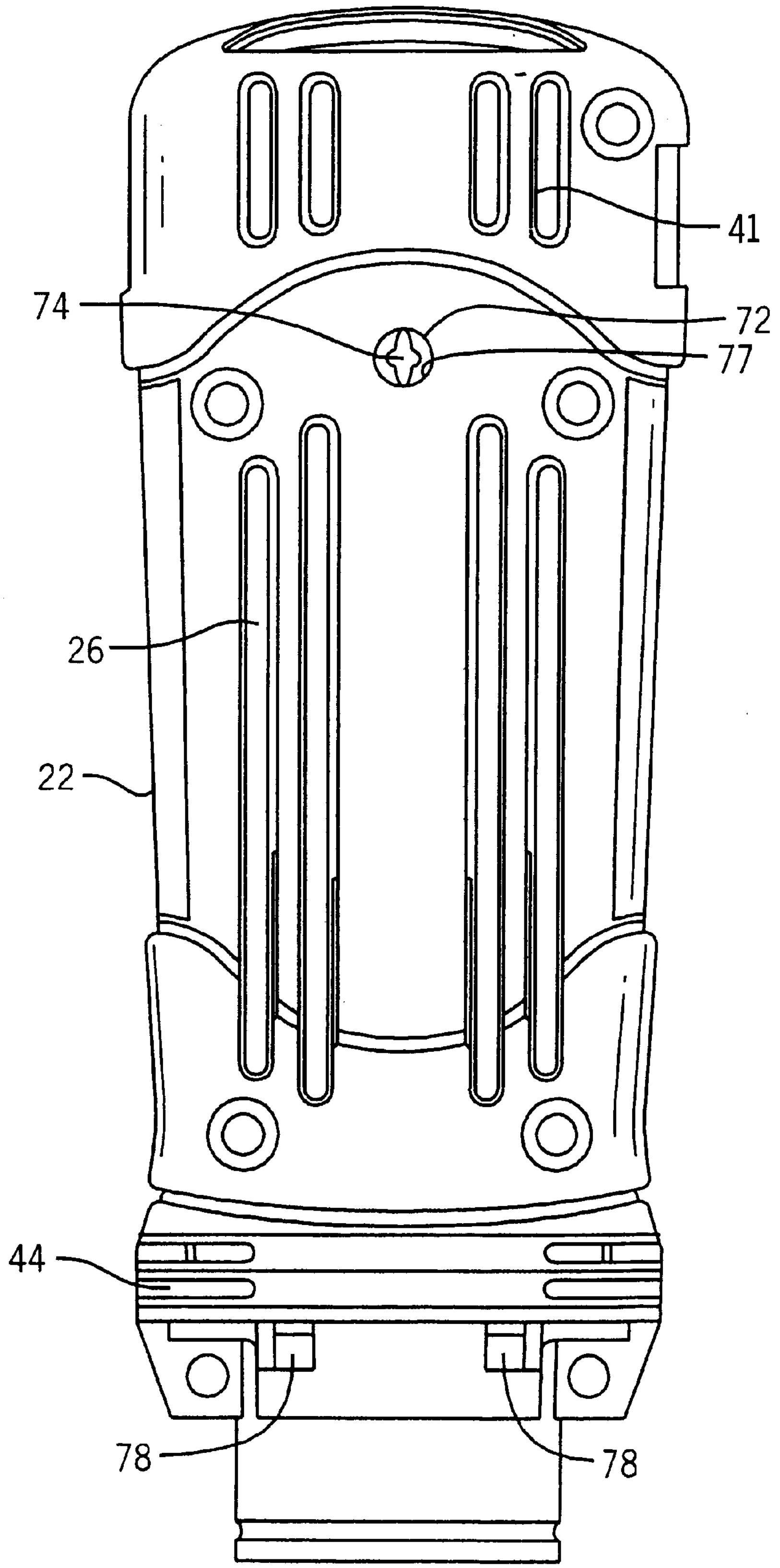
FIG. 3 is a partial side view of the spiral cutting tool of FIG. 2, as taken along the line 3—3 thereof, showing apertures formed in the spiral cutting tool motor housing for the mounting of a detachable handle thereto.
Figure 4:
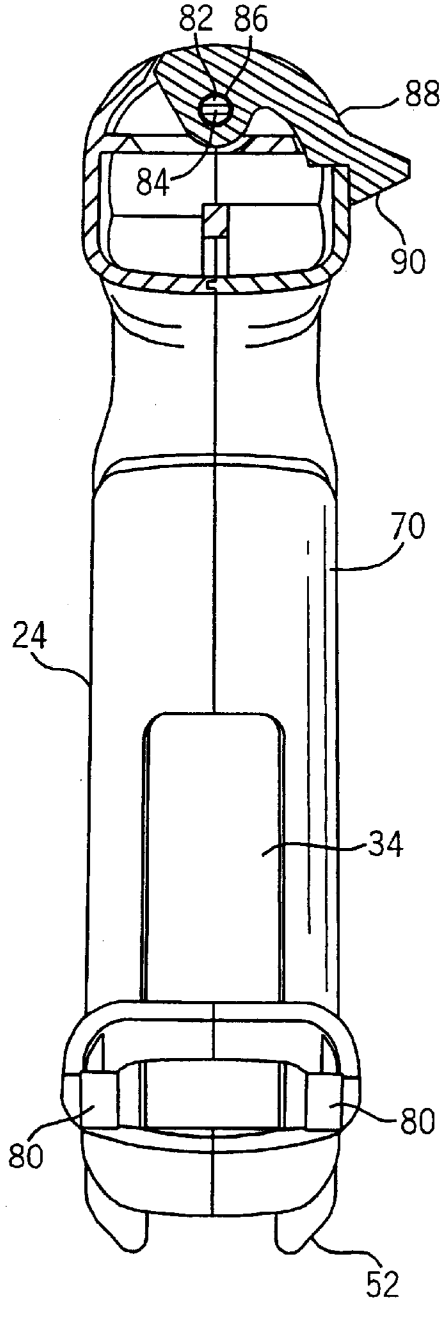
FIG. 4 is a front view, in partial cross-section, of a detachable handle for a spiral cutting tool in accordance with the present invention, as taken along the line 4—4 of FIG. 2, and showing a lever mechanism of a moveable mounting mechanism for securing the handle in position on the tool in a closed position for securing the handle on the tool.
Figure 5:
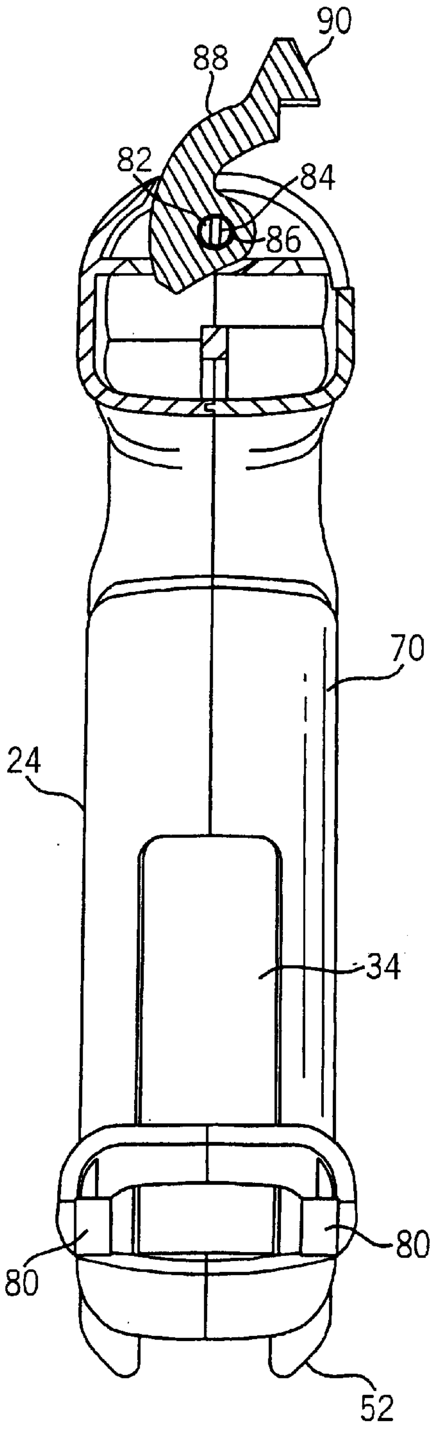
FIG. 5 is a front view, in partial cross-section, of a detachable handle for a spiral cutting tool in accordance with the present invention, as shown in FIG. 4, and showing the lever mechanism of a moveable mounting mechanism for securing the handle in position on the tool in an open position for mounting the handle on and removing the handle from the tool.
Figure 6:
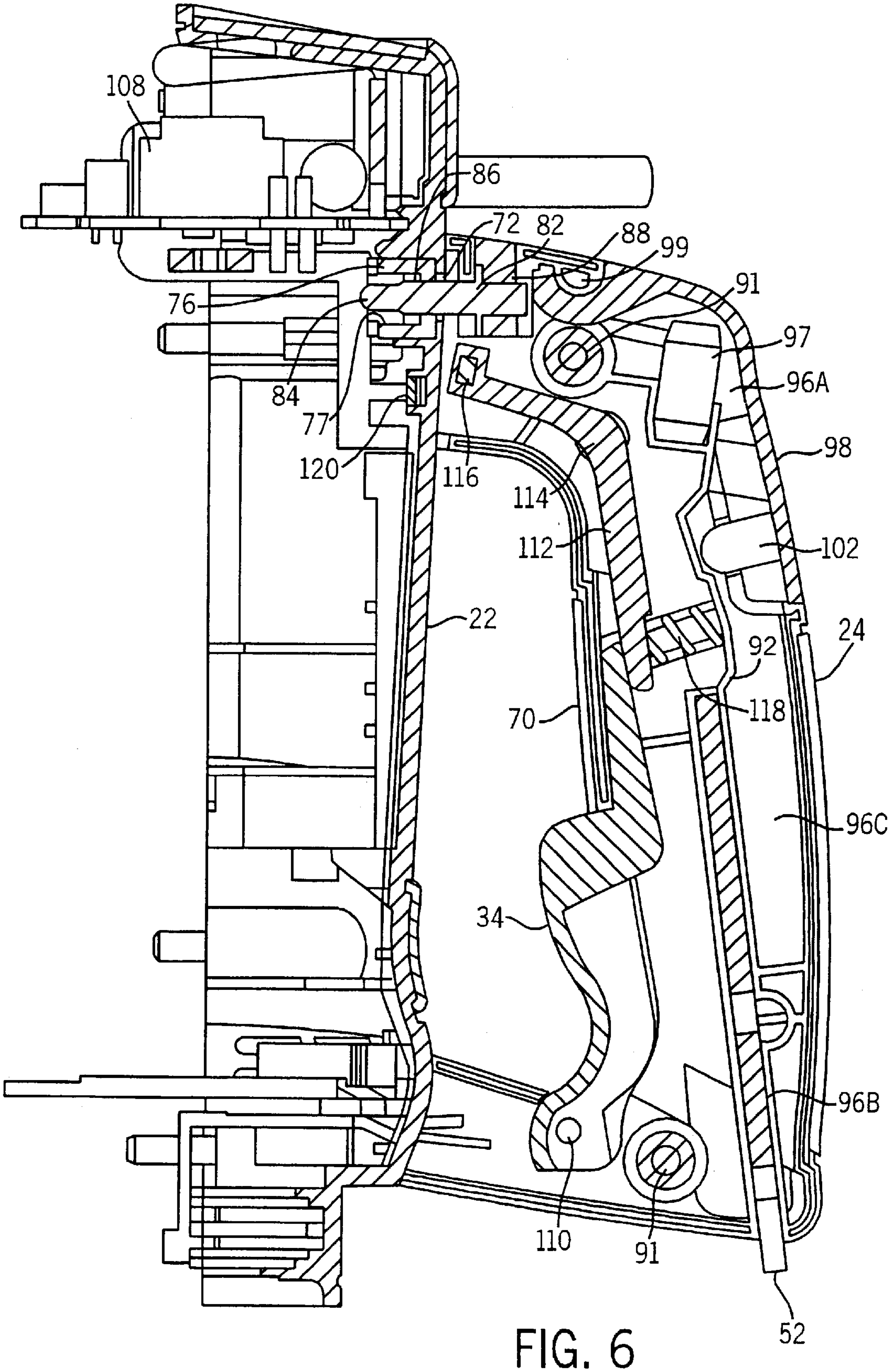
FIG. 6 is a cross-sectional view of a detachable handle and a portion of a spiral cutting tool in accordance with the present invention, as taken along line 6—6 of FIG. 1, showing the handle as attached to the spiral cutting tool motor housing, and showing a trigger switch for operating a spiral cutting tool motor mounted in the detachable handle and storage compartments formed therein.

A preferred structure for detachably attaching the handle 24 to the cutting tool 20 is described in detail with reference to FIGS. 3–6. This structure provides for quick and easy release of the detachable handle 24 from the tool housing 22, and quick and secure attachment of the detachable handle 24 thereto. As shown in FIG. 3, the motor housing 22 preferably includes first 72 and second 78 fixed mounting structures formed therein for attaching the detachable handle 24 to the housing 22. For example, a first aperture 72 is formed on a side of the housing 22 to which the handle 24 is to be attached near an end of the housing 22 opposite the end of the tool 20 from which the motor shaft extends. As illustrated in FIG. 3, the first handle mounting aperture 72 preferably includes a slot aperture 74 formed therein. The slot aperture 74 may be formed in a metallic plate or insert 76, as illustrated in FIG. 6, mounted within the housing 22 in a conventional manner behind the first housing aperture 72. A sidewall of the insert 76 may be threaded to form a threaded aperture wall 77 within the first aperture 72. One or more second mounting apertures 78 are formed in the side of the motor housing 22 near the end of the motor housing 22 from which the motor shaft emerges from the housing. As illustrated, preferably two such second mounting apertures 78 are formed in the motor housing 22. The first mounting aperture 72 and the second mounting apertures 78 are preferably positioned on the motor housing 22 with respect to each other such that when the detachable handle 24 is attached to the housing 22 in the manner to be described below, the handle gripping surface 70 is aligned substantially parallel with the axis of the cutting tool housing 22.

The detachable handle 24 is attached to the housing 22 by a fixed handle mounting structure 80 formed on a first end of the handle, to be coupled to the second fixed mounting structure 78 formed in the housing 22, and a moveable mounting mechanism 82, mounted in a second end of the handle 24, to be coupled to the first fixed mounting structure 72 formed in the housing 22. For example, fixed extending handle tabs 80 may be formed at one end of the handle 24 for insertion into the corresponding second housing apertures 78, and a rotatable rod 82 may be mounted extending from the other end of the detachable handle 24 for insertion into the aperture slot 74 formed in the first housing aperture 72. The extending handle tabs 80 may be integrally formed as part of the handle 24, or attached thereto in a conventional manner, such as using an adhesive, etc., or may be implemented as a separate metal part attached to the handle 24. The tabs 80 preferably extend from one end of the handle and turn downward to form a hook-like configuration. The extending handle tabs 80 are preferably spaced apart on the end of the handle 24 such that the spacing between the handle tabs 80 corresponds to the spacing between the second apertures 78 formed in the housing 22. The hook shape of the extending handle tabs 80 allows the handle tabs 80 to be inserted into the apertures 78 in a manner such that the extending handle tabs 80 are hooked within the apertures 78 within and behind a portion of the housing 22. In other words, when the handle 24 is positioned on the housing 22 with the extending handle tabs 80 positioned properly in the apertures 78, the end of the handle with the extending handle tabs 80 extending therefrom cannot be removed in a radial direction from the housing 22, because the tabs 80 are hooked within the housing 22.

The rotatable rod 82 extends from the other end of the handle 24, i.e., the end of the handle 24 opposite the end of the handle 24 having the extending tabs 80 extending therefrom. The rotatable rod 82 is positioned on the handle 24 such that the rotatable rod 82 may be inserted into the first aperture 72 formed in the housing 22, to position the handle 24 on the housing 22 when the extending handle tabs 80 are positioned in the housing apertures 78. The rotatable rod 82 preferably includes a radially extending and flattened portion 84 formed at a distal end thereof. A second radially extending portion 86 is preferably formed on the rotatable rod 82 proximal to the distal radially extending portion 84. The rotatable rod 82 is attached to a lever mechanism 88, which extends, at least in part, outside of the detachable handle 24. The portion of the lever 88 extending from the removable handle 24 preferably includes an extending tab 90. The extending tab 90 is positioned on the lever 88, and the lever 88 is positioned on the detachable handle 24, such that the lever 88 may be operated easily by, e.g., an operator's thumb positioned adjacent to the tab 90 when the handle 24 is grasped in a normal manner by the operator for use of the cutting tool 20 to which the handle 24 is attached.

The lever mechanism 88 and rotatable rod 82 are mounted in the end of the detachable handle 24 in a conventional manner such that the rotatable rod 82 is rotatable therein by operation of the lever 88. When the lever mechanism 88 is rotated into an "open" position, as illustrated in FIG. 5, the radially extending and flattened distal portion 84 of the rotatable rod 82 is oriented such that the distal end 84 of the rod 82 may be inserted into the slot 74 formed in the first aperture 72 in the tool housing 22. The lever mechanism 88 is put into this "open" position for mounting the handle to, and removing the handle 24 from, the housing 22. When the lever mechanism 88 is rotated into a "closed" position, as illustrated in FIG. 4, the radially extending and flattened distal end 84 of the rotatable rod 82 is rotated into a position perpendicular to the orientation of the slot 74 formed in the first aperture 72 in the housing 22. In this position, the distal end 84 of the rotatable rod 82 cannot be inserted into the aperture 72, or removed therefrom, if the rod 82 has been positioned in the aperture 72. Thus, the lever mechanism 88 is operated to rotate the rotatable rod 82 into this "closed" position when the handle 24 is placed in the proper position on the housing 22, to secure the detachable handle 24 to the housing.

The detachable handle 24 is further securely attached to the housing 22 by interaction of the second radially extending portion 86 of the rotatable rod 82 with the threaded wall 77 of the first aperture 72 formed in the housing 22. With the rotatable rod 82 extended into the aperture 72 such that the second radially extending portion 86 thereof is positioned adjacent to the threaded wall 77 of the aperture 72, as the lever 88 is operated from the open position (FIG. 5) to the closed position (FIG. 4), to rotate the rotatable rod 82, the second radially extending portion 86 is rotated along the threading formed on the wall 77 of the aperture 72 to pull the rotatable rod 82 inward, thereby pulling the end of the handle 24 in which the rotatable rod 82 is mounted tightly against the housing 22. With the end of the handle 24 having the rotatable rod 82 extending therefrom pulled tightly against the housing 22, the handle 24 is secured tightly to the housing 22, i.e., movement of the handle 24 with respect to the housing 22 is prevented.

The following method may, therefore, be employed to easily, quickly, and securely attach the detachable handle 24 to the tool housing 22, and to easily and quickly remove the handle 24 from the housing 22. The handle 24 is positioned such that the hook-shaped tabs 80 extending from one end of the handle 24 are aligned with the tab apertures 78 formed in the housing 22. The handle 24 is tilted backward slightly, and the ends of the hooked tabs 80 are extended into the apertures 78 such that the ends of the hooked tabs 80 are engaged within the housing 22. With the tabs 80 hooked in the second apertures 78, the other end of the handle 24 is brought forward toward the first aperture 72 formed in the housing 22. With the lever 88 rotated into the open position (FIG. 5), the radially extending and flattened distal end 84 of the rotatable rod 82 is extended through the slot 74 formed in the aperture 72. With the distal end of the rotatable rod 82 extended into the slot 74, the second radially extending portion 86 of the rotatable rod 82 is engaged with the threads formed in the wall 77 of the first aperture 72. The lever 88 is then rotated from the open position (FIG. 5) to the closed position (FIG. 4). This rotates the rotatable rod 82 such that the radially extending and flattened distal end 84 of the rod 82 is rotated into an orientation perpendicular to the slot 74 formed in the aperture 72. This prevents the distal end 84 of the rod 82 from being removed from the aperture 72. The rotation of the lever 88 also causes the second radially extending portion 86 of the rod 82 to rotate in the threads formed in the wall 77 of the aperture 72, thereby pulling the end of the handle 24 tightly against the housing 22. In this manner, the detachable handle 24 is easily, quickly, and very securely attached to the housing 22, using a single hand, and without need for any special tools.

To remove the detachable handle 24 from the housing 22, the lever 88 is rotated from the closed position (FIG. 4) to the open position (FIG. 5). As the lever 88 is rotated, the second radially extending portion 86 of the rotatable rod 82 is rotated in the threads formed in the wall 77 of the first housing aperture 72, in a loosening direction, thereby causing the end of the handle 24 to move slightly away from the housing 22. The rotation of the rod 22 also causes the radially extending and flattened distal end 84 of the rod 82 to be aligned with the slot 74 formed in the rod aperture 72, such that the rod 82 is removable from the aperture 72 by pulling the end of the handle 24 away from the tool housing 22. With the end of the handle having the rotatable rod 82 mounted therein removed from the housing 22, the handle 24 may be lifted away from the housing 22 to remove the hook-shaped extended tabs 80 from the second apertures 78 formed in the housing 22. In this manner, the detachable handle 24 is easily and quickly removed from the housing 22 using a single hand, and without need for any special tools.

The detachable handle 24 of the present invention is preferably made of an electrically insulating material, such as hard plastic. The handle 24 may be formed of such a material in two complementary and symmetric halves by a conventional molding process. The two halves are then joined together to form the complete handle 24. The two handle halves may be joined together in a conventional manner, for example, using an adhesive. The two handle halves are also preferably screwed together, using screws or another type of fastener. For this purpose, screw holes 91 may be formed in the handle halves.

As illustrated in FIG. 6, the handle 24 is substantially hollow, but includes molded internal structural elements 92 which provide strength and rigidity to the handle 24. The internal structural elements 92 of the handle 24 give the handle 24 the strength and rigidity of a solid handle, without requiring the amount of material required to form a solid handle, and with the light weight of a substantially hollow handle. Minimizing the weight of the handle 24 in this manner helps to minimize the fatigue experienced by an operator using the tool 20 with the handle 24 in place.

The structural elements 92 of the detachable handle 24 not only provide strength and rigidity to the handle 24, but also form hollow compartments or chambers 96 within the handle 24. Compartments formed by the structural elements 92 of the handle 24 may be positioned so as to be employed for convenient storage locations. For example, as illustrated in FIG. 6, a collet 97 and the wrench 52 for tightening the collet nut 48 may be stored conveniently in compartments 96A and 96B, respectively, formed inside the handle 24. A third compartment 96C may be provided for storage of, for example, extra spiral cutting tool bits.

Storage compartments 96A and 96C are accessed via an aperture in the handle 24. To prevent objects stored in the compartments 96A and 96C from sliding out during use of the tool 20, a compartment door 98 may preferably be provided to cover the compartment aperture. The door 98 may preferably be a hinged door, which is attached via a hinge structure 99 to the detachable handle 24. The hinged door 98 may be opened about the hinge 99 structure to access the compartments 96A and 96C within the detachable handle 24. Ridges 100, or other gripping surfaces, may be formed on the hinged door 99 to facilitate grasping of the door 98 to open and close the door 98. Conventional latching tabs 102 may preferably be formed, e.g., on the inside of the door 98, to engage the inside of the detachable handle 24 to maintain the door 98 in a closed position when a tool 20 to which the handle 24 is attached is in operation.

The other accessible handle compartment 96B preferably may be specifically designed to hold the wrench 52 within the handle 24 when it is not in use. An aperture in the handle 24 provides access to the wrench compartment 96B. The size of the compartment 96B is such that the wrench 52 is held snugly therein, to prevent it from sliding out during operation of the tool 20. As illustrated in FIGS. 1 and 2, a portion 104 of the handle 24 around the aperture to the wrench compartment 96B is reduced in width such that, when the wrench 52 is placed in the compartment 96B, the head of the wrench extends slightly from this portion 104 of the sides of the handle 24. This permits the head of the wrench 52 to be grasped to pull the wrench 52 from the compartment 96B.

The compartments 96 in the power tool handle 24 allow power tool accessories, such as extra cutting tool bits or collets 97, to be kept conveniently at hand, and separate from other tools and accessories. It should be noted that various storage compartments of different sizes and shapes than those described may be incorporated into the handle 24. Also, various types of doors or other covers may be used to close off or access the compartments 96. Moreover, it is clear that a user may store any items he chooses within the storage compartments 96. In the embodiment described herein, however, one compartment 96B is specifically designed to hold the wrench 54.

As discussed above, the detachable handle 24 includes a trigger switch 34 mounted therein for turning the spiral cutting tool motor on and off when the detachable handle 24 is attached to the spiral cutting tool motor housing 22. The trigger switch 34 is preferably mounted adjacent to the gripping surface 70 of the detachable handle 24 on a side of the handle 24 facing the spiral cutting tool motor housing 22 when the detachable handle 24 is attached to the housing 22. The trigger switch 34 is preferably positioned on the detachable handle 24 such that the trigger switch 34 is operable by the little finger (pinkie) and ring finger of the hand of an operator when an operator is grasping the handle 24 for use of the tool 20 to which the handle is attached. The trigger switch 34 is thus preferably positioned at a lower end of the side of the detachable handle 24 facing the tool housing 22. This positioning of the trigger switch 34 on the detachable handle 24 allows the operator's stronger middle finger, index finger, and thumb to be used solely for holding and controlling the tool 20 to which the handle 24 is attached. The grip of these stronger fingers on the handle 24 need not be loosened to turn the tool on and off, as the trigger switch 34 provides for on/off operation of the tool 20 using two weaker fingers. Furthermore, the stronger fingers of the hand are less likely to become fatigued due to continuous holding of a trigger switch in an on position during operation of the tool. (There is a tendency to grasp a tool handle too strongly, and in a very fatiguing manner, when the same fingers are used for activating a trigger switch as are used for holding and controlling the tool itself.)

The operator of a spiral cutting tool 20 in accordance with the present invention may activate the tool motor by actuating the trigger switch 34 mounted in the detachable handle 24. The actuation of the trigger switch 34 mounted in the detachable handle must be communicated to a motor controller 108 mounted in the motor housing 22. (Note that the motor controller 108 may be implemented as any circuit for controlling activation of the tool motor. Thus, the motor controller 108 may be implemented using a programmable device, such as a microprocessor, using discreet analog or digital components, or even using a simple wiring scheme.) Preferably, the mechanism for coupling the trigger switch 34 in the detachable handle 24 to the motor controller 108 in the motor housing 20 does not interfere with the easy, quick and secure attachment of the detachable handle 24 to the housing 22, or the easy and quick removal of the handle 24 therefrom. In accordance with the present invention, the trigger switch 34 is coupled to the motor controller 108 without a direct mechanical connection between the trigger switch 34 in the detachable handle 24, and the motor controller 108 in the motor housing 22. (This also allows for coupling the trigger switch 34 to the motor controller 108 without providing an additional aperture in the housing 22, through which potentially damaging debris may enter the motor housing 22 when the detachable handle 24 is not attached thereto.)

In accordance with a preferred and exemplary embodiment of the present invention, the trigger switch 34 is coupled to the motor controller 108 using a magnet 116 mounted on a moveable arm 112 which is mounted in the detachable handle 24 to be moved in response to actuation of the trigger switch 34, and a magnetic field sensor 120 (such as a hall effect sensor) mounted in the tool housing 22 and coupled to the motor controller 108 for detecting movement of the magnet 116 when the trigger switch 34 is actuated to move the moveable arm 112. The trigger switch 34 may be mounted in the detachable handle 24 so as to be rotatable about a pivot point 110. For example, as illustrated in FIG. 6, the trigger switch 34 may be mounted in the detachable handle 24 so as to be rotatable about a point 110 located near a bottom end of the trigger switch within the detachable handle 24. At the opposite end of the trigger switch, within the detachable handle 24, the end of the trigger switch 34 is placed in contact with a first end of the moveable arm 112. The moveable arm 112 is preferably mounted in the detachable handle 24 so as to be rotatable about a pivot point 114 located near the center of the moveable arm 112. The magnet 116 is mounted in or attached to the end of the moveable arm 112, in a conventional manner, opposite the end thereof which is in contact with the trigger switch 34. A compression spring 118 may be mounted in the detachable handle so as to press against the end of the moveable arm 112 where the moveable arm 112 contacts the trigger switch 34. Thus, the compression spring 118 biases the moveable arm 112 against the end of the trigger switch 34, thereby also biasing the trigger switch 34 into an "off" position. In this position, as illustrated in FIG. 6, the magnet 116 mounted in the moveable arm 112 is positioned at a spaced apart distance from the housing 22 of the tool 20 (when the detachable handle 24 is attached to the housing 22). When the trigger switch 34 is actuated, by an operator of the tool 20, the switch 34 is rotated about pivot point 110 and the end of the trigger switch 34 in contact with the moveable arm 112 presses the end of the moveable arm 112 against the biasing action of the compression spring 118, compressing the compression spring 118, and rotating the moveable arm 112 about pivot point 114. This moves the magnet 116 mounted in the end of the moveable arm 112 opposite the compression spring 118 forward, in closer proximity to the tool housing 22 (when the detachable handle 24 is attached to the housing 22).

The magnetic field sensor 120, such as a Hall effect sensor, is mounted within the tool housing 22, opposite the position of the magnet 116 when the trigger switch 34 is actuated. The magnetic field sensor 120 may be any conventional sensor adapted to detect when the magnet 116 is moved forward into a position adjacent to the housing 22, i.e., when the magnet 116 is moved into the "on" position by an operator actuating the trigger switch 34. The magnetic field sensor 120 is coupled to the motor controller 108 in a conventional manner, so as to provide a signal to the motor controller 108 to turn the tool motor on when the magnet 116 is moved into the "on" position. Note that the spiral cutting tool housing 22 is preferably made of a dielectric material, such that the magnetic field sensor 120 may be mounted within the housing 22, and operation thereof in combination with the magnet 116 to turn the tool motor on will not be affected by the presence of a portion of the motor housing 22 between the magnet 116 and magnetic field sensor 120. Thus, there is no need to form an additional aperture in the housing 22 to couple the trigger switch 34 to the motor controller 108.

When the trigger switch 34 is released, the compression spring 118 operates to rotate the trigger switch 34 and moveable arm 112 about pivot points 110 and 114, respectively, back into the "off" position. In this position, the magnet 116 is moved back away from the housing 22 a sufficient distance such that the magnetic field sensor 120 no longer detects the presence of the magnet 116. When the presence of the magnet is no longer detected by the sensor 120, it provides a signal (or ceases providing a signal) to the motor controller 108 to turn off the tool motor. Thus, the preferred mechanism for coupling the trigger switch 34 to the motor controller 108 in accordance with the present invention does not employ a direct mechanical connection between trigger switch 34 and the motor controller 108. The mechanism for coupling the trigger switch 34 in the detachable handle 24 to the motor controller 108 in the motor housing 22 therefor does not interfere with the easy and quick attachment of the detachable handle 24 to, and removal of the detachable handle 24 from, the motor housing 22.

Figure 7:
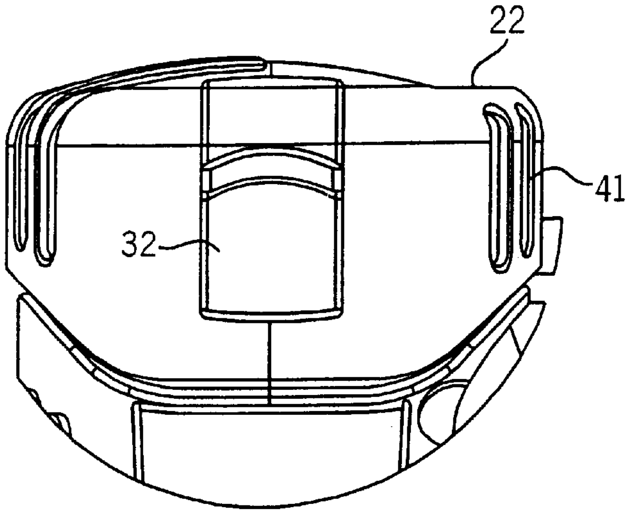
FIGS. 7, 8, and 9 show a portion of the housing of a spiral cutting tool in accordance with the present invention, showing a multiple-position on/off power switch mounted thereon and in a first "off" position, a second trigger switch enabled position, and a third "on" position, respectively.
Figure 8:
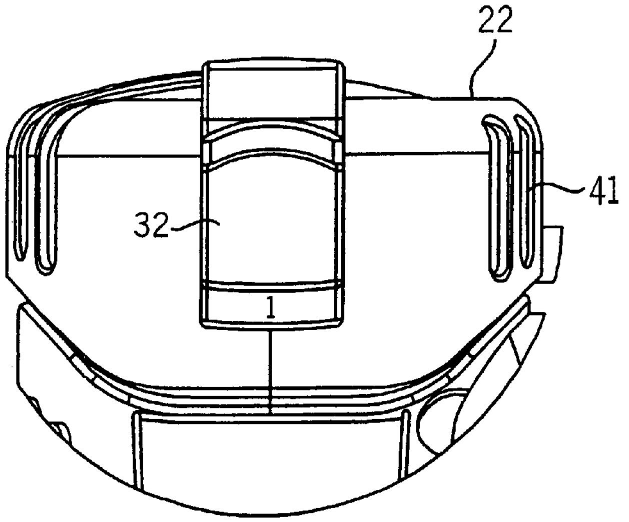
Figure 9:
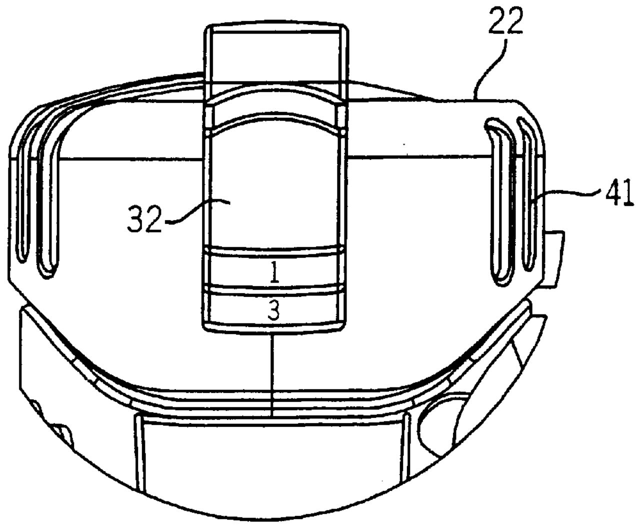

As discussed above, a spiral cutting tool 20 in accordance with the present invention preferably includes a multiple-position on/off power switch 32 mounted in the tool housing 22. The multiple-position on/off power switch 32 is preferably employed to both turn the tool motor on and off and to enable operation of the trigger switch 34 to turn the tool motor on and off. For example, in a first operating position of the multiple-position on/off switch 32, as illustrated in FIG. 7, the spiral cutting tool motor is turned off, and operation of the tool motor by the trigger switch 34 is disabled. Thus, with the multiple-position on/off switch in this first position, the tool motor cannot be turned on by actuating the trigger switch 34 mounted in the detachable handle 24 attached to the cutting tool 20. In a second operating position of the multiple-position on/off switch 32, as illustrated in FIG. 8, the tool motor remains off, but the trigger switch 34 is enabled to turn the tool on and off. Thus, when the multiple position on/off switch 32 is in this second position, the tool motor may be activated by actuating the trigger switch 34 mounted in the detachable handle 24 attached to the tool 20. The tool motor 20 is turned off by releasing the trigger switch 34. In a third operating position of the multiple position on/off switch, as illustrated in FIG. 9, the tool motor is turned on. In this position, as in the first position, the trigger switch 34 is also disabled. In other words, when the multiple position on/off switch 32 is in the third position, the tool motor is turned on, and may not be turned off by either actuating or releasing the trigger switch 34.

Figure 11:
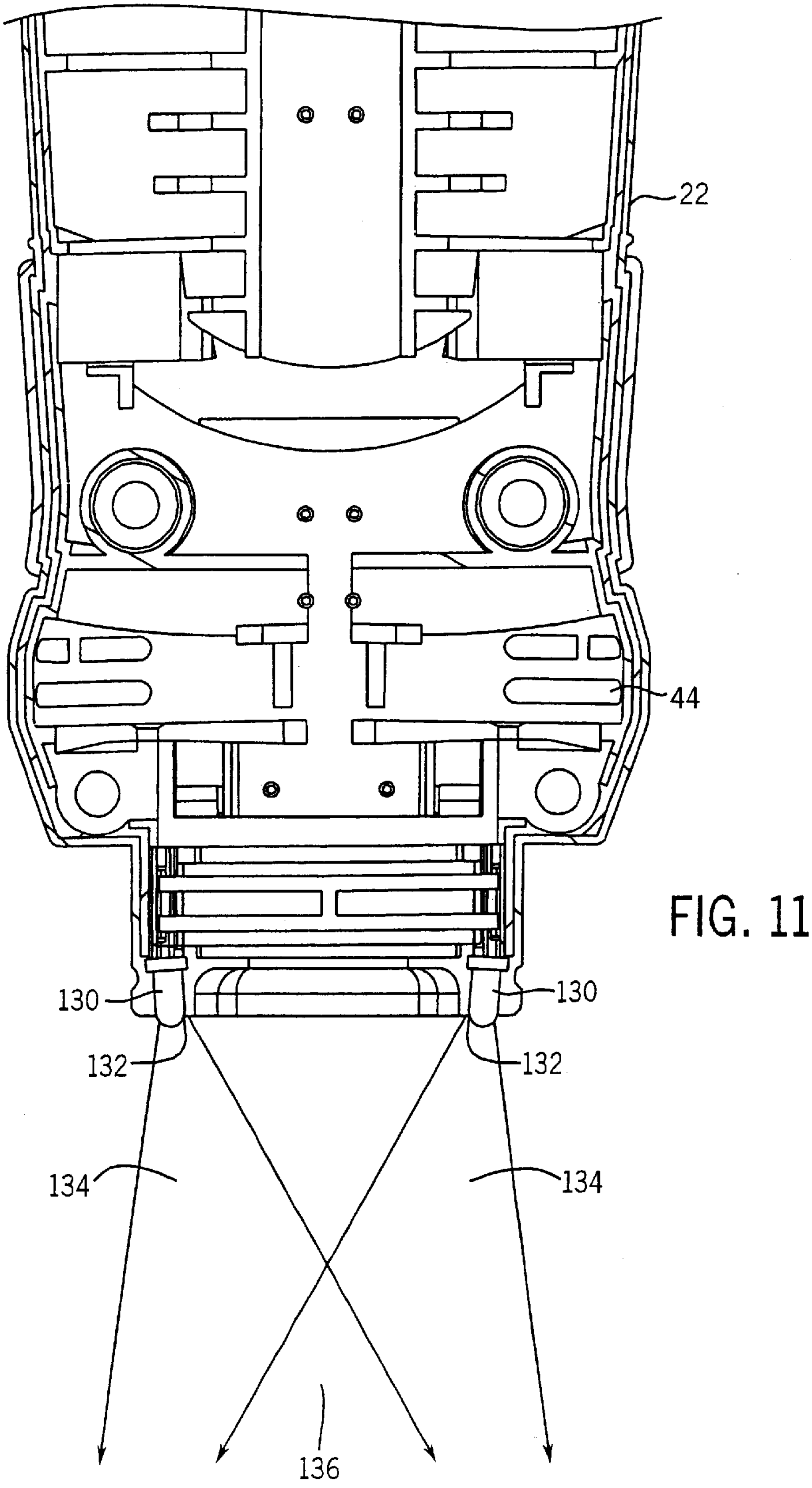
FIG. 11 is a cross-sectional view of a portion of the motor housing of a spiral cutting tool in accordance with the present invention, showing high output LEDs mounted therein at angles for directing crossing beams of light onto a workpiece being cut using the tool.
Figure 12:
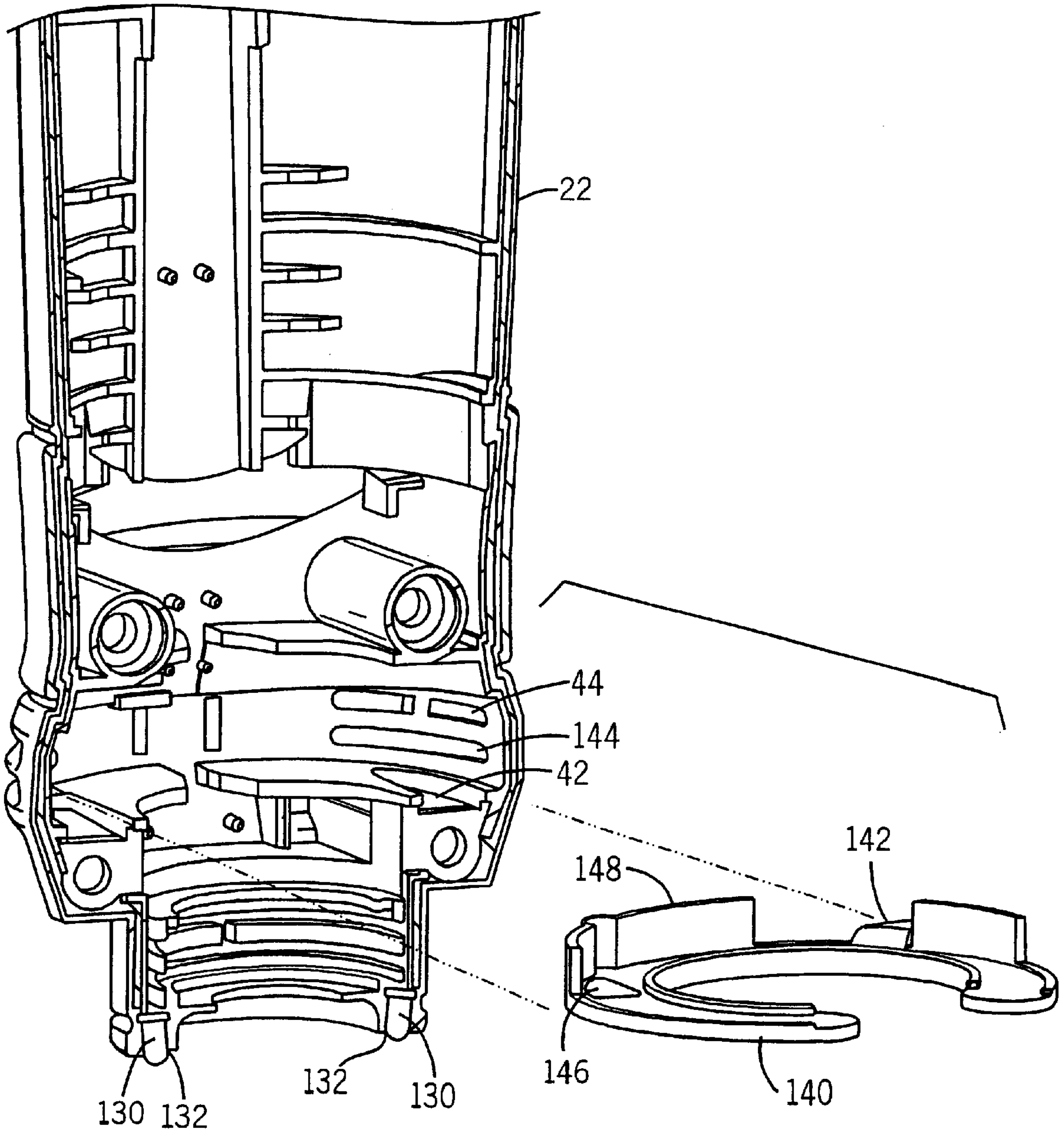
FIG. 12 is an exploded perspective view of the bottom portion of the motor housing illustrated in FIG. 11 and a moveable air vent cover to be mounted in the bottom portion of the motor housing for diverting a flow of air through air vents toward a workpiece or away from a workpiece depending upon the position of the air vent cover.

A spiral cutting tool, or other hand-held power tool, in accordance with the present invention preferably provides for improved visibility of a workpiece at the point of a cut being made by the cutting tool 20. In accordance with the present invention, improved visibility under poor lighting conditions is provided by one or more high-output LEDs 130 mounted in the tool housing 22 at the end thereof from which a motor shaft extends, to which a spiral cutting tool bit or other accessory is attached. As illustrated in FIGS. 10–12, one or more high-output LEDs 130 may be mounted, in a conventional manner, in LED apertures 132 formed in the end of the spiral cutting tool housing 22. (The LEDs 130 may be implemented using commercially available high-output LEDs.) Preferably, two or more LEDs 130 are mounted in the housing 22. The two or more LEDs 130 are preferably mounted in the housing 22 so as to be spaced apart around the mounting structure 46 for mounting, e.g., a spiral cutting tool bit to the cutting tool motor shaft. (E.g., two high-output LEDs 130 are preferably positioned on opposite sides of the motor shaft.) As illustrated in FIG. 11, the high-output LEDs 130 are preferably mounted at angles within the housing 22. (This may be achieved by forming the LED apertures 132 in the housing 22 at the desired angles with respect to the axis of the motor housing 22.) The angles with which the LEDs 130 are mounted in the housing 22 are preferably selected such that the beams of light 134 emitted by the LEDs 130 form an overlap area 136 which is positioned at the point of a cut when the tool 20 is in operation. That is, the angles with which the LEDs 130 are mounted in the housing 22 are preferably selected so that the beam overlap area 136 corresponds, e.g., to the location where a spiral cutting tool bit mounted on the spiral cutting tool 20 enters a workpiece being cut thereby. The LEDs 130 mounted in the spiral cutting tool housing 22 are preferably turned on whenever the cutting tool motor is in operation. It should be understood that, although two LEDs 130 are illustrated in the exemplary embodiment of the present invention shown in FIGS. 10–12, more than two high-output LEDs 130 may be mounted in the end of the motor housing 22 to illuminate a workpiece at the point of a cut, with the plurality of LEDs 132 mounted in the housing 22 at angles to form an overlap area 136 of light beams 134 at the point of the cut.

As a workpiece, such as a piece of wood, is cut using a spiral cutting tool 20, cutting debris, such as sawdust, will tend to deposit and build up on the workpiece surface. This debris can interfere with the visibility of the operator trying to control the cutting tool 20 to make a precise cut of a desired shape. For example, the debris may obscure a cut line marked on the workpiece by the operator. A spiral cutting tool 20 in accordance with the present invention preferably includes one or more air vents 42 formed in the bottom of the cutting tool housing 22 to direct a flow of air onto a workpiece being cut, to thereby blow debris, such as sawdust, therefrom, to thereby enhance visibility at the point of a cut. As discussed above, a flow of air from the air vents 42 may be provided by a fan rotated by the cutting tool motor to provide a flow of air through the cutting tool housing 22 to cool the motor within the housing 22.

For some workpiece materials, it is desirable not to blow cutting debris away from the point of the cut. For example, a workpiece such as gypsum board drywall produces fine powdery cutting debris as a cut is made. It is not desirable to blow this material into the air. Therefore, in accordance with the present invention, a moveable air vent cover 140 is preferably provided, which allows the air vents 42 to be opened and closed, to provide for debris removal by air flow from the air vents 42, or to prevent such debris removal, as desired.

A preferred and exemplary embodiment of a movable air vent cover 140 which may be employed is illustrated in FIG. 12. The exemplary air vent cover 140 is implemented as a substantially flat ring 140 which is mounted within the cutting tool motor housing 22 adjacent to the air vents 42. The air vent cover 140 may be implemented as a complete or partially broken ring, as illustrated in FIG. 12. The air vent cover 140 is mounted for rotational movement within the housing 22 in a conventional manner. A tab 142 is preferably formed to extend radially from the air vent cover 140. The tab 142 is preferably formed to extend outward through a slot 144 formed in the housing 22, when the air vent cover 140 is positioned in the housing 22. Thus, an operator of the tool 20 is able to rotate the air vent cover 140 within the housing 22 by means of the tab 142 extending therefrom. The air vent cover 140 has one or more air vent apertures 146 formed therein. When the air vent cover 140 is rotated into the correct position, the air vent apertures 146 formed in the air vent cover 140 are aligned with the air vents 42, thereby allowing air flow through the motor housing 22 to exit through the air vents 42, to clear cutting debris away from the point of a cut. By rotating the air vent cover 140, using the extending tab 142, the air vent apertures 146 may be moved out of alignment with the air vents 42 such that the air vent cover 140 blocks the flow of air through the housing 22 from exiting through the air vents 42. Thus, by rotating the air vent cover 140, by use of the extending tab 142, the air vents 42 may be opened and closed to provide a flow of air to remove cutting debris away from a workpiece, or to prevent such a flow of air.

When the flow of air through the air vents 42 is blocked by the air vent cover 140, the flow of cooling air flowing through the tool housing 22 exits the housing 22 through exhaust air vents 44 formed in the side of the motor housing 22, in a direction away from the workpiece being cut. To increase the flow of air out of the air vents 42, at least some of the exhaust air vents 44 are preferably blocked when the air vent cover 140 is positioned such that air flow out of the air vents 42 is provided. One or more axially extending portions 148 may be formed on the air vent cover 140 for this purpose. As illustrated in FIG. 12, the axially extending portions 148 may be formed along the edge of the air vent cover 140. The axially extending portions 148 extend to a sufficient height, and are positioned on the air vent cover 140, such that the axially extending portions 148 may be positioned to block a flow of air through at least some of the air exhaust vents 44 when the air vent cover 140 is rotated into a position such that the air vent apertures 146 are aligned with the air vents 42. When the air vent cover 140 is rotated into a position such that the air vents 42 are covered by the air vent cover 140, the axially extending portions 148 no longer block the air exhaust vents 44. In this manner, air flow is redirected from the air exhaust vents 44 through the air vents 42 when the air vents 42 are opened, to increase the flow of air through the air vents 42, to remove cutting debris from a workpiece being cut.

The present invention provides a hand-held power tool with increased power tool control and visibility. Though described in detail herein with respect to a particular type of spiral cutting tool, it should be noted that the present invention is not limited in application to any particular spiral cutting tool design. The features of the present invention may be used with other types of spiral cutting tools, or similar hand-held power tools.

It is thus understood that this invention is not confined to the particular embodiments herein illustrated and described, but embraces such modified forms thereof as come within the scope of the following claims.

What is claimed is:

1. A hand held power tool with a detachable handle, comprising:

(a) a power tool housing having a motor therein and having first and second fixed housing mounting structures formed thereon;

(b) a detachable handle having first and second handle ends, a handle gripping surface extending between the first and second handle ends, and a trigger switch attached to the detachable handle; and (c) a movable arm coupled to the trigger switch, a magnet mounted on the movable arm and generating a magnetic field, and a magnetic field sensor for sensing at least one of a magnetic field and movement in the magnetic field, the magnetic field sensor being mounted in the power tool housing and coupled to the motor.

2. The hand held power tool with a detachable handle of claim 1 further comprising a fixed handle mounting structure formed on the first handle end and a movable handle mounting mechanism mounted on the second handle end, wherein the fixed handle mounting structure is adapted to engage the first fixed housing mounting structure and the moveable handle mounting mechanism is adapted to be coupled to the second fixed housing mounting structure.

3. The hand held power tool with a detachable handle of claim 2 wherein the first and second fixed housing mounting structures include first and second housing apertures, respectively, formed in the power tool housing.

4. The hand held power tool with a detachable handle of claim 3 wherein the fixed handle mounting structure includes at least one fixed tab extending from the first handle end and adapted to be inserted into the first housing aperture formed in the power tool housing.

5. The hand held power tool with a detachable handle of claim 4 wherein the fixed handle mounting structure includes at least one hooked tab extending from the first handle end and adapted to be inserted into the first housing aperture formed in the power tool housing and hooked within the power tool housing.

6. The hand held power tool with a detachable handle of claim 3 wherein the second fixed housing mounting structure includes a slot aperture formed therein and the moveable handle mounting mechanism includes a rotatable rod extending from the second handle end, the rotatable rod including an extending portion formed at a distal end extending radially from the axis of the rotatable rod.

7. The hand held power tool with a detachable handle of claim 6 wherein the second fixed housing mounting structure includes a threaded aperture wall formed therein and the rotatable rod includes a second extending portion formed thereon and adapted to engage the threaded aperture wall such that the second handle end is pulled toward the power tool housing to secure the second handle end to the power tool housing as the rotatable rod is rotated from a first rotational position to a second rotational position.

8. The hand held power tool with a detachable handle of claim 3 wherein the second fixed housing mounting structure includes a threaded aperture wall formed therein and wherein the moveable handle mounting mechanism includes a rotatable rod extending from the second handle end and mounted in the detachable handle for rotational movement therein, a lever mechanism attached to the rotatable rod and extending from the detachable,handle for rotating the rotatable rod between first and second rotational positions, and an extending portion formed on the rotatable rod extending radially from the axis of the rotatable rod.

9. The hand held power tool with a detachable handle of claim 2 wherein the detachable handle includes at least one storage compartment accessible through a compartment aperture in the handle.

10. The hand held power tool with a detachable handle of claim 9 comprising additionally a hinged door mounted on the detachable handle and positioned thereon to cover the compartment aperture.

11. The hand held power tool with a detachable handle of claim 2 wherein the trigger switch is coupled to a motor enclosed in the power tool housing when the detachable handle is mounted on the housing such that the motor is activated when the trigger switch is actuated.

12. The hand held power tool with a detachable handle of claim 11 wherein the trigger switch is mounted adjacent to the handle gripping surface.

13. The hand held power tool with a detachable handle of claim 11 wherein the trigger switch is coupled to a motor controller mounted in the power tool housing without a mechanical or electrical connection between the trigger switch and the motor controller.

14. The hand held power tool with a detachable handle of claim 2 further comprising means for rotating a tool bit attached to a shaft extending from an end of the power tool housing along an axis thereof, wherein the hand held power tool is adapted for forming cuts in a direction perpendicular to the axis of the power tool housing.

15. The hand held power tool with a detachable handle of claim 2 further comprising at least one light source attached to the power tool housing.

16. The hand held power tool with a detachable handle of claim 15 wherein the at least one light source comprises a light emitting diode.

17. The hand held power tool with a detachable handle of claim 2 further comprising means for directing an air flow included in the power tool housing.

18. The hand held power tool with a detachable handle of claim 17 wherein the means for directing an air flow comprises a fan mounted in the power tool housing.

19. The hand held power tool with a detachable handle of claim 17 further comprising at least one air vent formed in the power tool housing and a moveable air vent cover adapted to cover the at least one air vent.

20. A hand held power tool with a detachable handle, comprising:

(a) a power tool housing having a power tool motor mounted therein;

(b) a handle including means for detaching and reattaching the handle from the power tool housing by hand;

(c) a trigger switch mounted in the detachable handle and coupled to a movable arm having a magnet attached thereto; and (d) sensing means in the power tool housing for sensing at least one of a magnetic field produced by the magnet and movement of the field relative to the power tool housing.

21. The hand held power tool with a detachable handle of claim 20 wherein the trigger switch is mounted adjacent to a handle gripping surface included in the detachable handle.

22. The hand held power tool with a detachable handle of claim 20 wherein the sensing means is coupled to a motor controller mounted in the power tool housing.

23. The hand held power tool with a detachable handle of claim 22 wherein activating the trigger switch moves the magnet toward the sensing means and wherein the motor controller activates the motor when the sensing means senses the magnetic field or movement of the field from the magnet.

24. A hand held power tool comprising:

(a) a housing having a motor mounted therein;

(b) a detachable handle attached to the housing;

(c) a trigger switch mounted in the detachable handle;

(d) a magnet coupled to the trigger switch; and (e) a magnetic field sensor provided in the housing for sensing a magnetic field generated by the magnet.

25. The hand held power tool of claim 24 further comprising at least one light source attached to the housing.

26. The hand held power tool of claim 25 wherein the at least one light source comprises a light emitting diode.

27. The hand held power tool of claim 24 further comprising at least one air vent formed in an end of the housing and means for directing a flow of air from the air vent.

28. The hand held power tool of claim 27 wherein the means for directing a flow of air comprises a fan mounted in the housing.

29. The hand held power tool of claim 27 wherein the means for directing a flow of air is coupled to the motor.

30. The hand held power tool of claim 27 further comprising a moveable air vent cover for covering the air vent.

31. The hand held power tool of claim 27 further comprising two air vents formed in the end of the housing.

32. The power tool of claim 24 further comprising a moveable arm coupled to the magnet and the trigger switch.

33. The power tool of claim 24 wherein actuating the trigger switch moves the magnet toward the magnetic field sensor.

34. A power tool comprising:

(a) a housing having a motor and a motor controller mounted therein;

(b) a handle removably coupled to the power tool housing;

(c) a trigger switch attached to the handle;

(d) means for generating a field, the means for generating a field coupled to the trigger switch; and (e) a field detector provided in the housing and coupled to the motor controller for sensing at least one of the field and changes in the field.

35. The power tool of claim 34 wherein the means for generating a field comprises a magnet.

36. The power tool of claim 34 comprising additionally a moveable arm coupled to the trigger switch and to the means for generating a field to move the means for generating a field toward the field detector when the trigger switch is actuated, wherein the motor controller activates the motor when the field detector detects a field.

37. The power tool of claim 34 wherein the housing includes first and second fixed mounting structures and the handle includes a fixed handle mounting structure adapted to engage the first fixed mounting structure and a moveable handle mounting mechanism adapted to engage the second fixed mounting structure.

38. The power tool of claim 34 further comprising at least one of a light source and an air vent coupled to the housing.

39. The power tool of claim 34 wherein the field detector comprises a Hall effect sensor.

40. The power tool of claim 34 wherein the motor controller transmits a signal to the motor in response to actuation of the trigger switch.

41. A hand held power tool comprising:

(a) a housing having a motor and a motor controller mounted therein;

(b) a handle attached to the housing;

(c) a trigger switch mounted in the handle and coupled to the motor controller such that the power tool motor is activated by the motor controller when the trigger switch is actuated and the trigger switch is enabled, wherein the trigger switch is coupled to a means for generating a field; and (d) a field detector provided in the housing and coupled to the motor controller for sensing at least one of the field and changes in the field.

42. The hand held power tool of claim 41 wherein the handle is a detachable handle adapted to be attached to and removed from the power tool housing by hand.

43. The hand held power tool of claim 41 wherein the housing includes first and second fixed mounting structures and the handle includes a fixed handle mounting structure adapted to engage the first fixed mounting structure and a moveable handle mounting mechanism adapted to engage the second fixed mounting structure.

44. The land held power tool of claim 41 further comprising at least one of a light source and an air vent coupled to the housing.

45. The hand held power tool of claim 41 further comprising a moveable arm coupled to the trigger switch and to the means for generating a field.

46. The hand held power tool of claim 41 wherein actuating the trigger switch moves the means for generating a field toward the field detector.

47. The hand held power tool of claim 41, further comprising a multiple position power switch mounted on the power tool housing and coupled to the motor controller and having at least a first position for disabling the trigger switch and turning the motor off, a second position for enabling the trigger switch to activate the motor, and a third position for disabling the trigger switch and activating the motor.

48. A hand held power tool comprising:

a housing having a motor included therein;

a handle removably coupled to the housing, the handle being generally C-shaped and including a trigger switch for activating the motor, a magnet in the handle and coupled to the trigger switch; and a magnetic field sensor in the housing for sensing a magnetic field generated by the magnet.

49. A power tool comprising:

a housing having a motor mounted therein;

a handle removably coupled to the housing, the handle being generally C-shaped, the handle including two ends, each of the two ends having means for attaching the handle to the housing;

a magnet attached to a moveable arm included in the handle and coupled to the trigger switch; and a magnetic field sensor included in the housing for sensing a magnetic field generated by the magnet and coupled to the motor.

* * * * *

UNITED STATES PATENT AND TRADEMARK OFFICE

CERTIFICATE OF CORRECTION

PATENT NO. : 6,443,675 B1 
DATED : September 3, 2002
INVENTOR(S) : Robert K. Kopras et al.

It is certified that error appears in the above-identified patent and that said Letters Patent is hereby corrected as shown below:

Column 21,
Line 23, delete “detachable,handle” and insert therefor -- detachable handle --.

Column 24,
Line 3, delete “land” and insert therefor -- hand --.

Signed and Sealed this

Fourth Day of February, 2003

JAMES E. ROGAN
*Director of the United States Patent and Trademark Office*